United States Patent
Neeraj et al.

(10) Patent No.: US 12,287,723 B1
(45) Date of Patent: *Apr. 29, 2025

(54) ARTIFICIAL INTELLIGENCE AUTOMATIC TEST SELECTION

(71) Applicant: BrowserStack Limited, Dublin (IE)

(72) Inventors: Kollepara Neeraj, West Godavari (IN); Athul Pai, Bangalore (IN); Vishalan Shridhar Gharat, Mumbai (IN)

(73) Assignee: BrowserStack Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,811

(22) Filed: Oct. 17, 2024

(51) Int. Cl.
G06F 11/36 (2006.01)
G06F 11/3668 (2025.01)
G06F 11/3698 (2025.01)

(52) U.S. Cl.
CPC ...... G06F 11/3698 (2025.01); G06F 11/3696 (2013.01)

(58) Field of Classification Search
CPC .......... G06F 11/3688; G06F 11/3696
See application file for complete search history.

(56) References Cited

U.S. PATENT DOCUMENTS

| | | | | |
|---|---|---|---|---|
| 2015/0339213 A1* | 11/2015 | Lee | ..................... | G06F 11/3688 717/125 |
| 2018/0349256 A1* | 12/2018 | Fong | .................. | G06F 11/3684 |
| 2019/0155572 A1* | 5/2019 | Misra | .................. | G06F 11/3684 |
| 2020/0073790 A1* | 3/2020 | Abhishek | ............ | G06F 11/3692 |
| 2020/0401503 A1* | 12/2020 | Gao | ..................... | G06F 11/3696 |
| 2022/0156175 A1* | 5/2022 | Periyathambi | ...... | G06F 11/3688 |
| 2022/0206927 A1* | 6/2022 | Bakshi | ................ | G06F 11/3688 |
| 2024/0330169 A1* | 10/2024 | Hicks | .................. | G06F 11/3684 |

OTHER PUBLICATIONS

Speiker et al, Reinforcement Learning for Automatic Test Case Prioritization and Selection in Continuous Integration, 11 pages (Year: 2017).*

* cited by examiner

*Primary Examiner* — Wei Y Zhen
*Assistant Examiner* — Brahim Bourzik
(74) *Attorney, Agent, or Firm* — Cognition IP, P.C.; Edward Steakley; Saleh Kaihani

(57) ABSTRACT

A test case management tool integrated in a project management tool can include user interface elements supported by backend databases and a test case library database. The user interface elements can include an option for a user to request an automatic artificial intelligence-based recommendation for a ticket project stored in the project management tool. The automatic test case selection includes LLM summarization of the test cases in the test case library database, and semantic searching of ticket data against the summaries. Results can be improved by generating relationship counters, based on the relationships identified in the test case library database, scoring each test case, based on the relationship counters, and selecting higher scored test cases.

17 Claims, 17 Drawing Sheets ical Intelligence Automatic Test Selection

BACKGROUND

Field

This invention relates generally to the field of artificial intelligence and more particularly to automatic selection of test cases for a software development ticket, using artificial intelligence technology.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software developers utilize project management tools to oversee the progression of various tasks associated with coding, and testing of a digital product. The developers may also use test management tools to organize and track the numerous test cases that a developer team might reference for project management tasks. Existing tools for organizing and finding relevant tests can rely on inefficient methods. For example, a description of the test cases can be stored in a spreadsheet, where a developer team may use keyword searching to find relevant test cases. These, and similar techniques, for test case management can be inefficient and lack integration with project management tools. Consequently, there is a need for improved test case management tools and integration between test case management tools and project management tools.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

DETAILED DESCRIPTION

Figure 1:
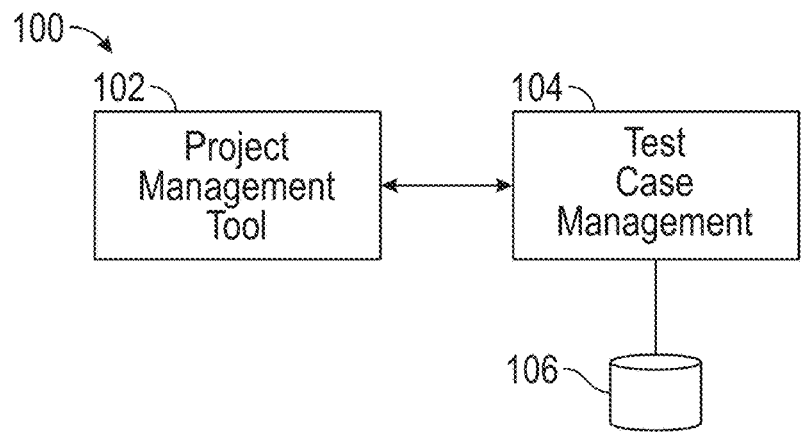
FIG. 1 illustrates a diagram of an environment of a project management tool and a test case management tool.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Testing and debugging software present a critical aspect of the development of modern digital products we enjoy. Websites and program applications can require extensive and ongoing testing and debugging to maintain proper operation and/or to launch new features. Software developers utilize a variety of tools to organize, track and perform testing. Project management tools, such as Atlassian® Jira® and others enable developers to manage and track a testing project among a team of developers. For example, project management tools enable the developers to document a "quality assurance" or QA ticket, describe the ticket, and assign the ticket to one or more team members. Project management tools also use a variety of user interfaces in combination with database operations to track the progress of a project. For example, a team member can be assigned a QA ticket. The team member can note the progress of the ticket project by selecting among options, such as "in progress," "completed," or with other progress markers, as may be defined by the team in the context of a given project.

In the area of software testing, developers also may use a test case management (TCM) tool (TCM). The test case management tool provides a user interface (UI) for developers to define and organize test cases for reference in the future. Several routine test projects and QA tickets can reuse a test case from prior or related projects. Furthermore, the test cases, just like the underlying software, can evolve and improve as a developer team refines its test cases to better test and debug an underlying product. Test cases can be snippets of code that perform a selected function or operate a process on a feature of a product. Test cases can also be a series of steps, outlined in a natural language, such as English, instructing a developer to perform a series of tasks related to a feature or a product and record the result of how the software responds in the test case management tool. An example test case, for an ecommerce website, can be to test the functionality of the shopping cart of the ecommerce website. The test case can outline, in English, steps, such as "add an item to the cart," "press check out," "observe correct total," etc. A developer team member can access the test case, via a TCM, perform the steps, and record the results in the TCM tool, and/or a project management tool.

FIG. 1 illustrates diagram 100 of an environment of a project management (PM) tool 102 and a test case management (TCM) tool 104. In many development environments, users prefer the project management tool 102 and the test case management tool 104 to be integrated, for example, via UI elements. In this manner, the developers can work with both tools in conjunction. For example, a developer, whose assigned a QA ticket with testing the functionality of a shopping cart, can recall and pull the steps for testing the shopping cart functionality, from the same UI screen of the QA ticket project in the PM tool 102, linked with a TCM tool 104. In some software environments, the PM tool 102 and TCM tool 104 are tools provided by different vendors. Nonetheless, plugins can be used to integrate the two. For example, the TCM tool 104 can be integrated into the PM tool 102 via a TCM plugin. The TCM plugin can be developed by the vendor building the TCM tool 104. In this scenario, the vendor building the PM tool 102 provides access to the TCM tool 104. For example, in the Atlassian® Jira® environment, Forge®, which is the Atlassian® app development platform, can be used to build a Jira® plugin to integrate a TCM tool 104 into Jira® environment. The TCM 104 can include a test case library 106. The test case library 106 can be implemented in a database, a server environment, in a cloud infrastructure, or any other selected database environment. The test case library 106 can provide various database features, for example, storage and searching capabilities, accessible via hypertext markup language (HTML) calls, application programming interface (API) calls, and/or other technologies.

Figure 2:
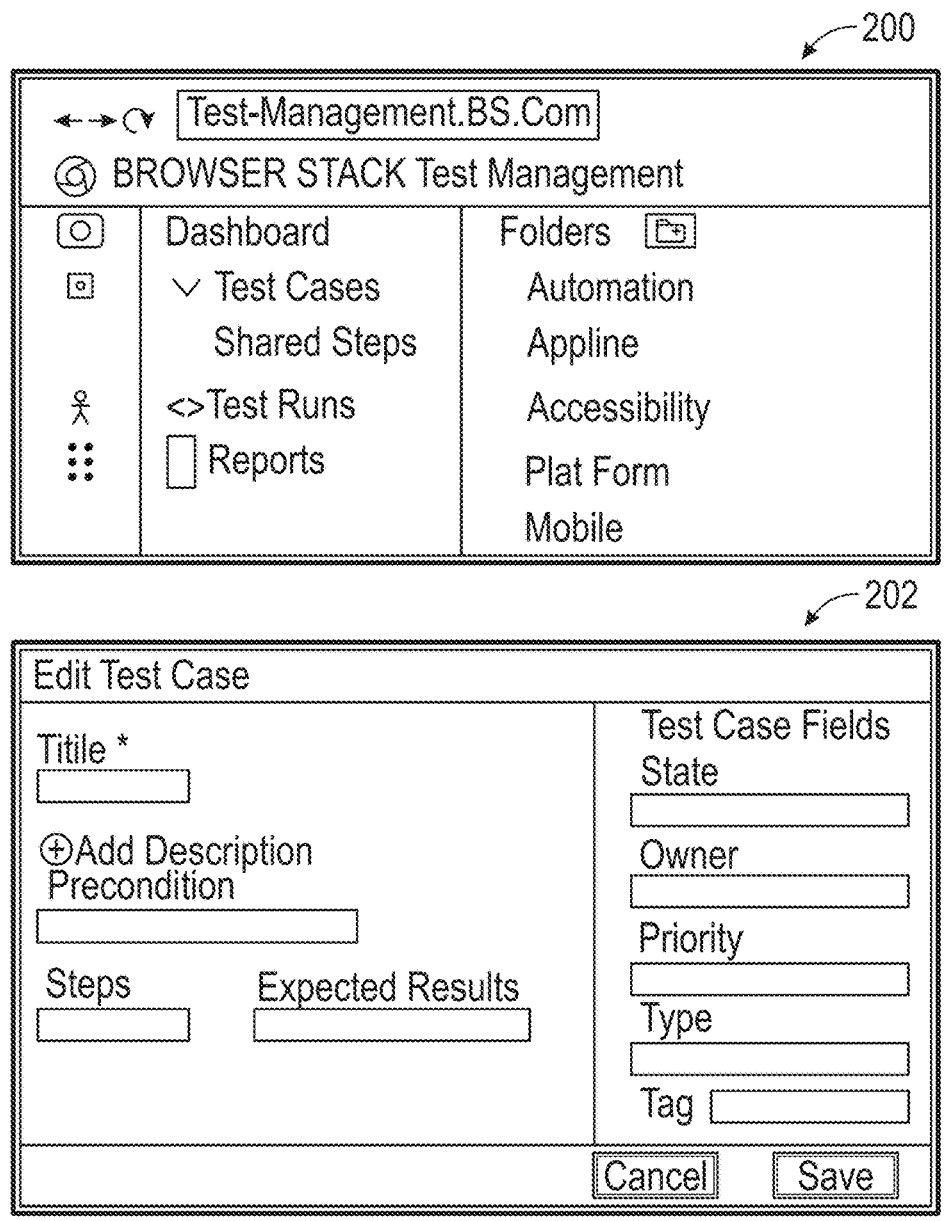
FIG. 2 illustrates example screenshots and of a test case management tool.

FIG. 2 illustrates example screenshots 200, 202 of a TCM tool 104. The TCM tool 104 can provide various functionality, including a dashboard and UI elements to allow a developer to define a test case. The TCM tool 104 can also enable the developer to use a folder structure to organize the test cases. A test case creation and/or editing screen can include UI elements to capture information, such as the title of a test case, a description of the test case, preconditions of a test case, steps to perform the test case, and expected results. Other fields associated with a test case can also be captured, including for example, the owner, priority and type of the test case. The TCM tool 104 and its UI elements can include and be supported by a backend database, including the test case library 106.

When approaching a ticket project, developers may use a variety of techniques and tools to determine relevant test cases to execute a ticket project. They might rely on the folder structure and the folder names that their teams have developed in the TCM tool 104 and the test case library 106. The developers can also rely on their memory of past projects to find relevant test cases. Some developer teams generate and maintain spreadsheets of test cases, descriptions and relevant use cases for the test cases. The developer teams can also query the test case library 106, as needed, for example by using keyword searching, to find relevant test cases. Using these techniques, the developers can assemble test cases to resolve a ticket project. Some developers manually assemble a collection of test cases, referred to as test runs, to resolve a ticket project.

In some embodiments, the operations of the PM tool 102 and/or the TCM tool 104 can include automatic detection and recommendation of test cases to the user. In this scenario, the PM tool 102 and/or the TCM tool 104 can include UI elements, where a user can request automatic selection of test cases relevant to a ticket project. Automatic test selection and recommendation can include background components and processes to prepare the TCM tool 104 for runtime recommendation of a selection of relevant test cases. The automatic test selection and recommendation feature of the TCM tool 104 can also include runtime components and processes.

Figure 3:
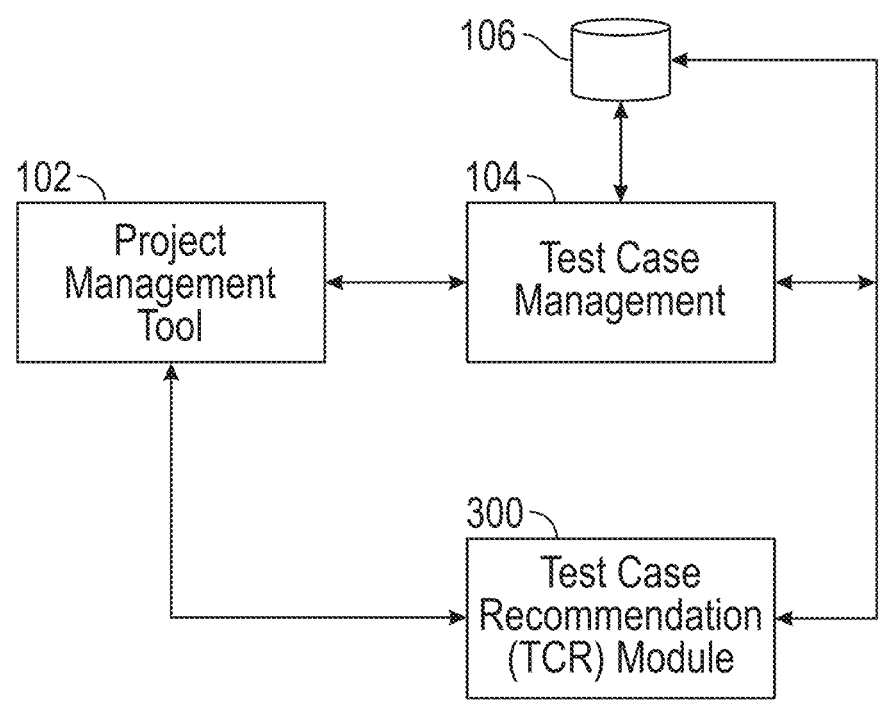
FIG. 3 illustrates a block diagram of a test case recommendation module in combination with a project management tool and a test case management tool.

FIG. 3 illustrates a block diagram of a test case recommendation (TCR) module 300 in combination with a project management tool 102 and a test case management tool 104. The TCR module 300 can perform background processes to prepare the tools for selecting and recommending test cases and/or test runs, during runtime. Runtime refers to a developer user, selecting a "recommend test cases" button in a UI element of the PM tool 102 and/or the TCM tool 104. When the user requests test cases, the TCR module 300 receives the relevant ticket project data from the PM tool 102 and presents a selection of test cases and/or test runs to the user via a UI element.

Figure 4:
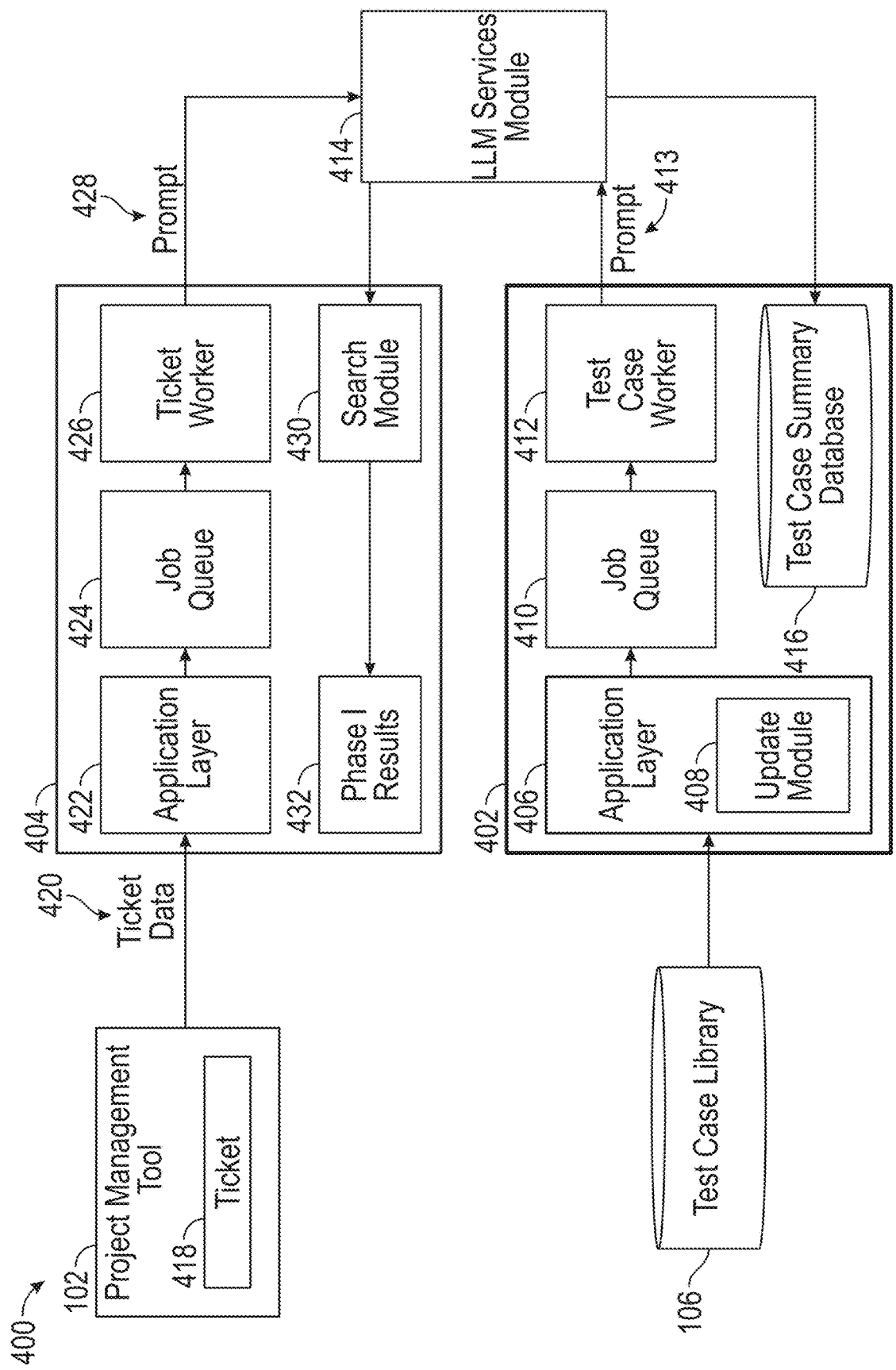
FIG. 4 illustrates a block diagram of the background and runtime components of the test case recommendation module.

FIG. 4 illustrates a block diagram 400 of the background components 402 and runtime components 404 of the TCR module 300. The background components 402 include an application layer 406. The application layer 406 includes the communication protocols and interface methods, used by the TCR module 300 to communicate with external entities. The application layer 406 can include interface methods to communicate with the test case library 106. In some embodiments, the application layer 406 can interface with a database management system (DBMS) of the test case library 106 to monitor the test cases in the library 106. The DBMS of the test case library 106 can provide an application programming interface (API) to the application layer 406 for communicating and interfacing with the test case library 106. The application layer 406, includes an update module 408 that monitors the test case library 106 for any update events related to the creation, deletion, or modification of a test case, or other events that can relate to an update of a test case or a related database entry. The application layer 406 and/or update module 408, places the updated test case into a job queue 410

Each test case can include a variety of fields, including for example, a title or a name, a description, preconditions of the test case, expected results, an outline of steps to perform the test case, an associated project or an associated folder, and other test case fields. Each test case also includes keywords. Keywords are terminology and text defined in the project management tools and/or test case management tools to be an identifier or descriptor of an issue or a project.

A test case worker 412 can interface with a large language model (LLM) services module 414 to summarize each test case. A large language model can be an artificial neural network that utilizes a transformer architecture to perform text prediction. A variety of LLM services modules 414 can be used. An example of the LLM services module 414 can include generative pre-trained transformer models, provided by OpenAI® of San Francisco, California (https://openai.com/). Other vendors also provide LLM services. The test case worker 412 can issue one or more prompts 413 to the LLM services module 414.

In some embodiments, the prompts 413 can include a configuration file to configure the models of the LLM services module 414 and/or issue instructions to configure and execute the models. In some implementations, the configuration file in the prompt 413 includes an outline of the model parameters and hyperparameters, including for example, a selection of models, model performance parameters, boundaries of the model parameters, frequency penalty, presence penalty, prompt temperature; maximum tokens considered by the model, and a method instruction to the model on how to generate a summary for each test case in a selected format (e.g., JavaScript Object Notation or JSON). The method additionally includes definitions and types of input/output parameters for the models of the LLM services module 414. In some embodiments, the prompt 413 includes an instruction to the models to preserve the keywords in the generated summary for each test case. The prompt 413 can also pass along to the LLM services module 414, one or more definitions of one or more computer-implemented methods of generating a summary response, based on which the LLM services module 414 is instructed to implement a computer-implemented summary response function to summarize the test cases. In some embodiments, a computer-based server implementing the DBMS functionality of the test case summary database 416 can be instructed by the LLM services module 414, or receive a command from the LLM services module 414, to store summaries of the test cases, generated based on a summary response function, outlined in the prompt 413.

The summarized test cases can be stored in a test case summary database 416. The test case summary database 416, in some embodiments, can be a vector database and the test case summaries can be stored as vector embeddings. As an example, the summarized test cases can be sent to text to vector embedding services, such as text-embedding-ada-002 for conversion into vector representation. The vectors can be stored in the test case summary database 416. Utilizing a vector embedding of the test cases can have the benefit of preserving the keywords, and the semantic contents of a test case. However, other data formats and data structures can also be used.

The update module 408 can monitor the test case library 106, for any changes to a test case. If an update to a test case is detected, the update module 408 can also update the job queue 410, which can cause the test case worker 412 to issue another prompt 413 to the LLM services module 414 to obtain an updated summary of the test case. The updated summary of the test case can be stored in the test case summary database 416. In other words, the update module 408 can keep the test case library 106, and the test case summary 416, in sync.

A user developer can generate a ticket 418 in the project management tool 102. The ticket 418 can be part of a larger test and development ticket project, or can be a root ticket. In other words, the ticket 418 can have parents, and children and/or otherwise be related to other tickets. The ticket 418 can include various fields and sections, as may be available in the project management tool 102. For example, the ticket 418 can have a description section, fields for indicating progress, fields for assigning the ticket to team members, and fields for project management tasks. Various ticket fields and data, including the ticket data of the parents and grandparents tickets and related tickets can be sent to the runtime components of the TCR module 300 as ticket data 420.

The runtime components 404 can include an application layer 422. The application layer 422, similar to the application layer 406, can include communication protocols and interface methods to communicate with external entities. For example, the application layer 422 can include interface methods to communicate with the project management tool 102 and receive the ticket data 420. In some embodiments, the application layer 422 and the application layer 406 can be implemented as a single component, which can perform both background and runtime operations.

The application layer 422 can interface with the project management tool 102 and retrieve and/or receive the ticket data 420. Ticket data 422 can include a variety of fields, including for example, a title section, description section, an issue field, type of project, parent/children name and issue designation, an identifier (ID) of a ticket, linked projects, issues, test cases, other project management fields, and the same information for the parent/child tickets and/or issues. Like the test cases, a ticket 418 can also include keywords. The application layer 422 places the ticket data 420 into a job queue for a ticket worker 426 to process.

The ticket worker 426 can interface with the large language model (LLM) services module 414 to summarize the ticket data 420. The large language model (LLM) services module 414 can be queried with prompts and configured to generate summaries of the ticket data 420. In some embodiments, the ticket worker 426 can issue one or more prompts 428 to the LLM services module 414. In some embodiments, the prompts 428 can include a configuration file to configure the models of the LLM services module 414 and/or issue instructions to configure and execute the models. In some implementations, the configuration file in the prompts 428 includes an outline of model parameters and hyperparameters, including for example, a selection of the models, frequency penalty, presence penalty, prompt temperature; maximum tokens considered by the model, and a method instruction to the model on how to generate a summary for each test case in a selected format (e.g., JavaScript Object Notation or JSON). The method additionally includes definitions and types of input/output parameters for the models of the LLM services module 414. In some embodiments, the prompt 428 includes an instruction to the models to preserve the keywords in the generated summary for each test case.

In some embodiments, the prompt 428 includes an instruction to the models to preserve the keywords in the generated summary for each test case. The prompt 428 can also pass along to the LLM services module 414, one or more definitions of one or more computer-implemented methods of generating a summary response, based on which the LLM services module 414 is instructed to implement a computer-implemented summary response function to summarize the ticket data 420. In some embodiments, a computer-based server implementing a search module 430 can be instructed by the LLM services module 414 to receive a command from the LLM services module 414, passing along a summary of the ticket data 420, generated by the LLM services module 414, based on a summary response function, outlined in the prompt 428.

The search module 430 can run a search (e.g., a semantic search), finding matches between ticket summaries received from the LLM services module 414 and the test case summary database 416. In some embodiments, the test case summaries, received from the LLM services module 414 can include a test case identifier along with the associated summaries of that test case, as generated by the LLM services module 414. Various fields in a ticket summary can be queried, by the search module 430, to find corresponding matches in the summaries generated by the LLM services module 414 and the summaries stored in the test case summary database 416. The matched test case summaries can have associated test case identifiers. The test case identifiers can be used to compile phase I results 432. Phase I results 432 can be a set of test cases outputted by the search module 430. In some embodiments, the test cases in phase I results 432 can be presented as one or more test runs, to a user developer via a UI element in the project management tool 102 and/or the TCM tool 104. Test runs in this context refers to a collection of test cases.

In some embodiments, phase I results 432 can be further improved, based on existing relationships between the test cases in the test case library 106, the data in the project management tool 102, and/or the test case management tool 104. For example, historical data on relationship and frequency of usage of a test case can be a basis to further improve the phase I results 432. In some embodiments, a plurality of relationship parameters can be defined, based on which, the phase results 432 can be further improved. For example, in some embodiments, the test cases in the phase I results 432 can be scored and weighted, based on a plurality of relationship parameters and weights. A selection of the test cases, having weighted scores above a threshold can be presented to the user as Phase II results. In some embodiments, statistical techniques can be used to make a selection of the weighted and scored test cases. For example, test cases from the phase I results 432, scoring in the top 80th percentile or 90th percentile can be selected as phase II results, and presented to a user.

Figure 5:
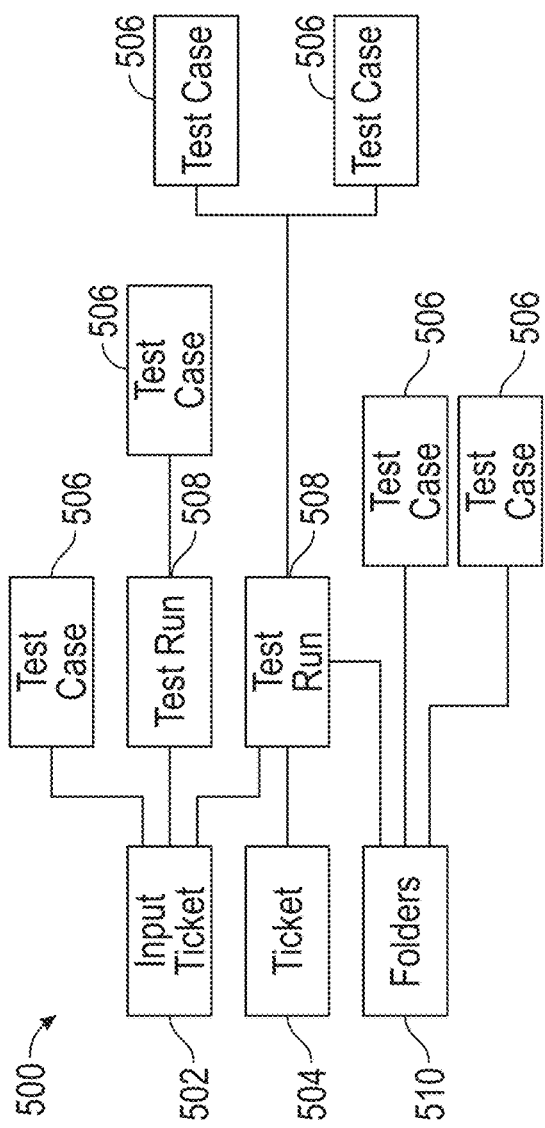
FIG. 5 illustrates a block diagram of various entities that can exist in a test case library.

FIG. 5 illustrates a block diagram 500 of various entities that can exist in a test case library 106. These entities can include an input ticket 502. The input ticket 502 can be a ticket project from which a user can send a request to the TCR module 300 to suggest or recommend an automated selection of test cases via a UI element. The test case library 106 can also include a history of other tickets 504. Other entities in the test case library 106 can include test cases 506, test runs 508 and folders 510. Folders are a collection of test cases. For example, a user developer team can define a nested folder structure to organize test cases related to a feature, such as the "check out" feature. An input ticket 502 can be linked to one or more test cases 506, one or more test runs 508 and one or more folders 510. The relationships in the test case library 106 can be interconnected, such that finding a linked test case, test run and/or folder can yield other connections or relationships. An input ticket 502 can have preexisting connections to one or more test cases 506, test runs 508, and/or folders 510. Preexisting connections can be due to a user manually generating those connections, or due to previous outputs of the TCR module 300. The described entities and relationships in the test case library 106 can be found by executing database queries. For example, one database query can be a command such as "return all connected entities to a test case 506," and so forth. A database management system (DBMS) and one or more application programming interfaces (APIs) and/or application servers can provide the tools for searching and querying the database in which the test case library 106 is implemented. In some embodiments, the test case library 106 can be embedded in a relational database, where the entities illustrated in diagram 500 can be stored as records in that database. Existing connections between entities in the test case library 106 can be utilized to identify more test cases and/or to improve the quality of recommendation in the output of the TCR module 300. Furthermore, the relationships and connections in the test case library 106 can differ in the strength of their relationship or connection to an input ticket 502. The described embodiments can be used to attribute weights to different relationships in the test case library 106. In some embodiments, the test cases that are found to be relevant to an input ticket 502 can be scored and/or ranked to determine test cases with higher degrees of applicability to the input ticket 502. A selection of the higher scored test cases can produce phase II results, which can be presented to a user via one or more user interface elements.

Figure 6:
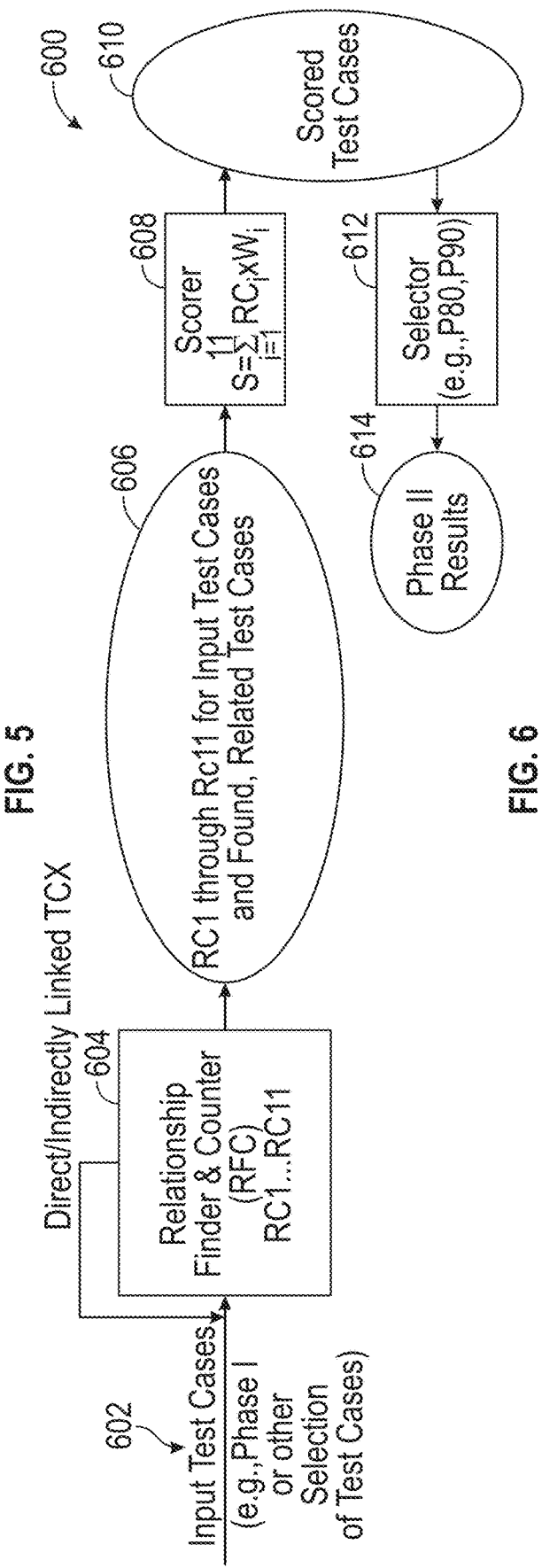
FIG. 6 illustrates a block diagram of utilizing the relationships in the test case library to produce improved test case recommendation.

FIG. 6 illustrates a block diagram 600 of utilizing the relationships in the test case library 106 to produce improved phase II results. Compared to phase I results, phase II results can include more test cases having higher relevancy to an input ticket 502. In some embodiments, phase II operations can be performed independently of phase I, and/or as a stand-alone series of operations, performed to find relevant test cases. In other words, phase II operations can be executed, both with or without phase I results as input.

A relationship finder and counter (RFC) 604 can execute database queries on the test case library 106 to find relationships between entities, such as those illustrated in diagram 500, and an input test case 502. For example, RFC 604 can interface with a database management system (DBMS) of the test case library 106, where entities such as tickets 504, test runs 508, test cases 506, and folders 510 are stored as records in a database implementing the test case library 106. The RFC 604 can receive as input a collection of input test cases 602. The input test cases 602 can be from phase I results 432, and/or other test cases. For example, in some embodiments, the RFC 604 can use some or all of the input test cases 602 to find additional test cases. The additional test cases can also be used as input to the RFC 604. The RFC 604 can also increment a counter corresponding to each relationship for a test case 506. Therefore, in some implementations, the RFC 604 can perform a first series of operations directed to identifying additional test cases, based on the input test cases 602, and a second series of operations directed to incrementing a plurality of relationship counters (RCs) for each input test case and/or additionally found test cases. In other implementations, the two functions of the RFC 604 can be bifurcated and performed by two independent modules.

In some embodiments, a plurality of relationship counters (RCs) can be incremented for each input test case. The relationship counters can keep a tally of the number of times a relationship is recorded in the test case library 106. Some relationship counters can be a true/false value, depending on whether the relationship or connection in the test case library 106 is detected or not. In some embodiments, the RFC 604 stores and increments a different selection of RCs for different categories of input test cases 602. In other words, in some embodiments, depending on the type of input test cases 602, the RFC 604 stores and/or increments a corresponding set of relationship counters RCs. For example, for input test cases 602 from phase I results 432, one set of RCs can be stored and/or incremented, and for input test cases 602 from other sources, a different set of RCs can be applied.

In one implementation, eleven relationship counters (RCs) for each input test case 602 can be stored and/or incremented. Examples of relationship counters can include RC1: test run linkage count, RC2: ticket linkage count, RC3: ticket to test run linkage count, RC4: folder linkage count, RC5: directly linked test case linkage count, RC6: indirectly linked test case linkage count, and RC7-RC11. Relationship counters RC1-RC11 will further be described in relation to the embodiments of FIGS. 7 and 8.

A scorer 608 can compile the relationship counters for each test case into a score for that test case. Various statistical techniques can be used to compile a score. For example, in some embodiments, a weighted average can be the score for each test case. In this scenario, a weight parameter for each relationship counter can be used to generate the weighted average. The weight parameter can be determined based on a relative scale, giving more weight to relationship counters corresponding to relationships that have more relevance to identifying relevant test cases for an input ticket 502. For example, a direct linkage to an input ticket 502 can indicate a high relevance of a test case enjoying that relationship. Consequently, a relationship counter (RC) corresponding to direct linkage to an input ticket 502 can be assigned a higher weight parameter in the weighted average calculation. In some embodiments, the weight parameters can be empirically driven and determined by manipulating the weight parameters and determining the weight parameter values that rank the test cases, similar to a known ranking. In other embodiments, more optimum weight parameter values can be determined, using artificial intelligence techniques. As an example, a score for a test case TC1, given relationship counters RC1 through RC11, can be generated, using Equation (1), where $w_i$ is the weight parameter for a relationship counter $RC_i$.

$$\text{Score} = \sum_{i=1}^{11} RC_i w_i \quad \text{Equation (1)}$$

Other statistical techniques can also be used to determine a score for each test case, TC #, based on the relationship counters (RCs) for each test case. Other example statistical techniques include arithmetic average, geometric average, weighted mean with weights estimated by gamlss with quadratic variance function, and other techniques. The scorer 608 can generate scored test cases 610, based on the input test cases 602. A selector 612 can choose a selection of higher scored test cases from the scored test cases 610 and can output them as phase II results 614. The selector 612 can use a variety of techniques, statistical or otherwise, to choose a selection of the test cases. For example, in some embodiments, the selector 612 can choose test cases, having scores in the 80th or 90th percentile, as phase II results 614.

Figure 7A:
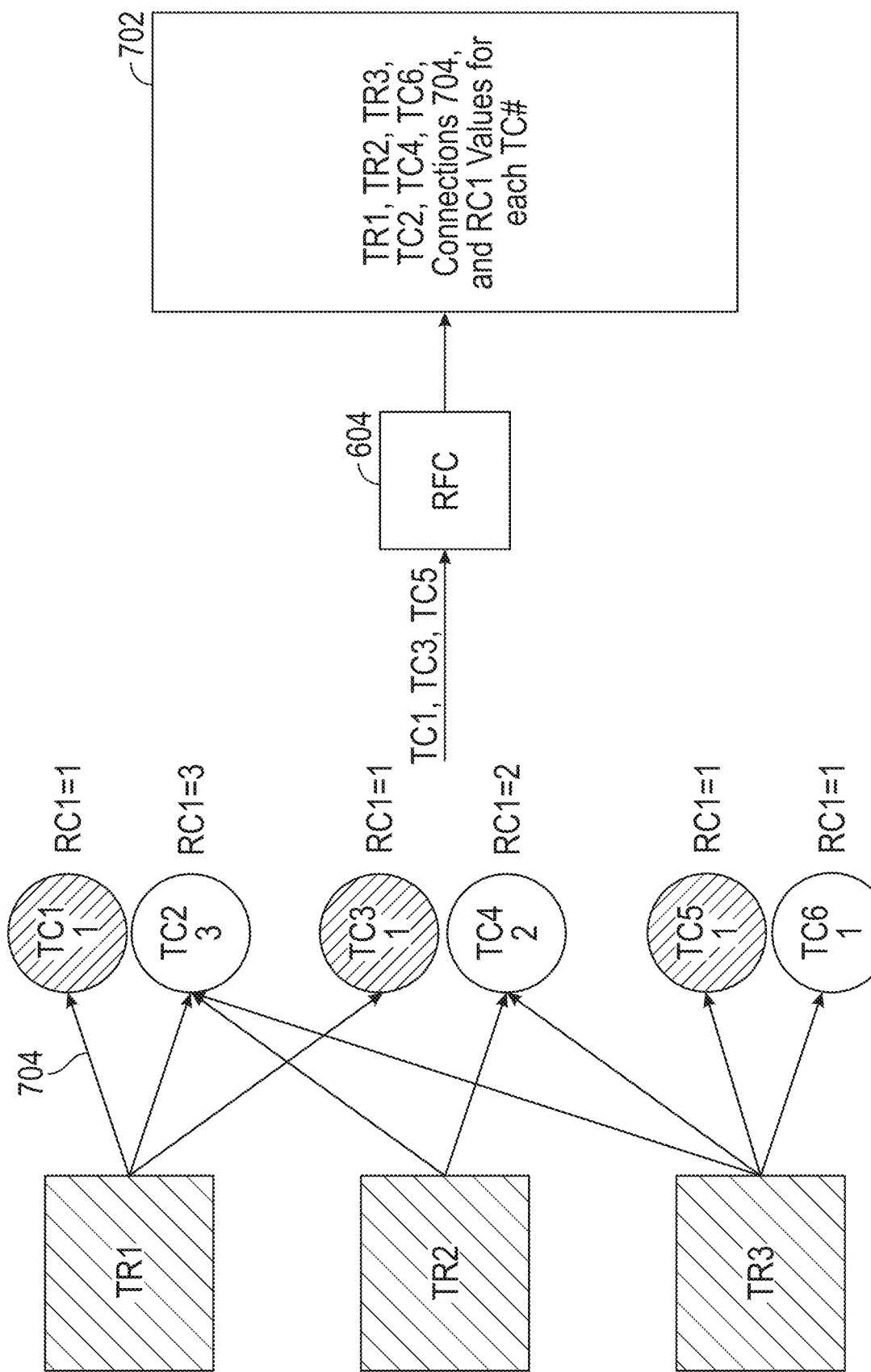
FIGS. 7 and 8 illustrate example block diagrams of generating relationship counters to improve the quality of the recommended test cases.

FIG. 7A illustrates example block diagrams of generating a relationship counter, RC1, corresponding to test run linkage count. In this example, input test cases 602 include tests cases TC1, TC3, and TC5. The input test cases can be from phase I results 432. The RFC 604 queries the test case library 106 and determines that the input test cases are linked with test runs, TR1, TR2, and TR3. The test run connections may have been generated and stored in the test case library 106 because of previous outputs of the TCR module 300 or may have been manually generated in the test case library 106, and/or may have otherwise been previously or historically generated in the test case library 106 through other methods. The test runs, TR1, TR2, and TR3 can yield more test cases, TC2, TC4 and TC6, that were not included in the input test cases TC1, TC3, and TC5.

In this example, after determining related entities test runs TR1, TR2, TR3, test cases TC2, TC4, TC6, and their connections 704, the RFC 604 can generate a relationship counter, RC1, corresponding to test run linkage count for each test case, including for those that were not in the input, but were later found through connections 704. In the example shown, the relationship counter RC1 for each test case TC # is also shown. The output 702 of the RFC 604, in this example, includes the connected test runs TR1, TR2, TR3, the newly found test cases, TC2, TC4 and TC6, their connections 704, and the relationship counter RC1 for each test case TC #, including test cases, not in the input test cases TC1, TC3, and TC5. The relationship count embedded in RC1 can be summarized as "test run linkage count."

Figure 7B:
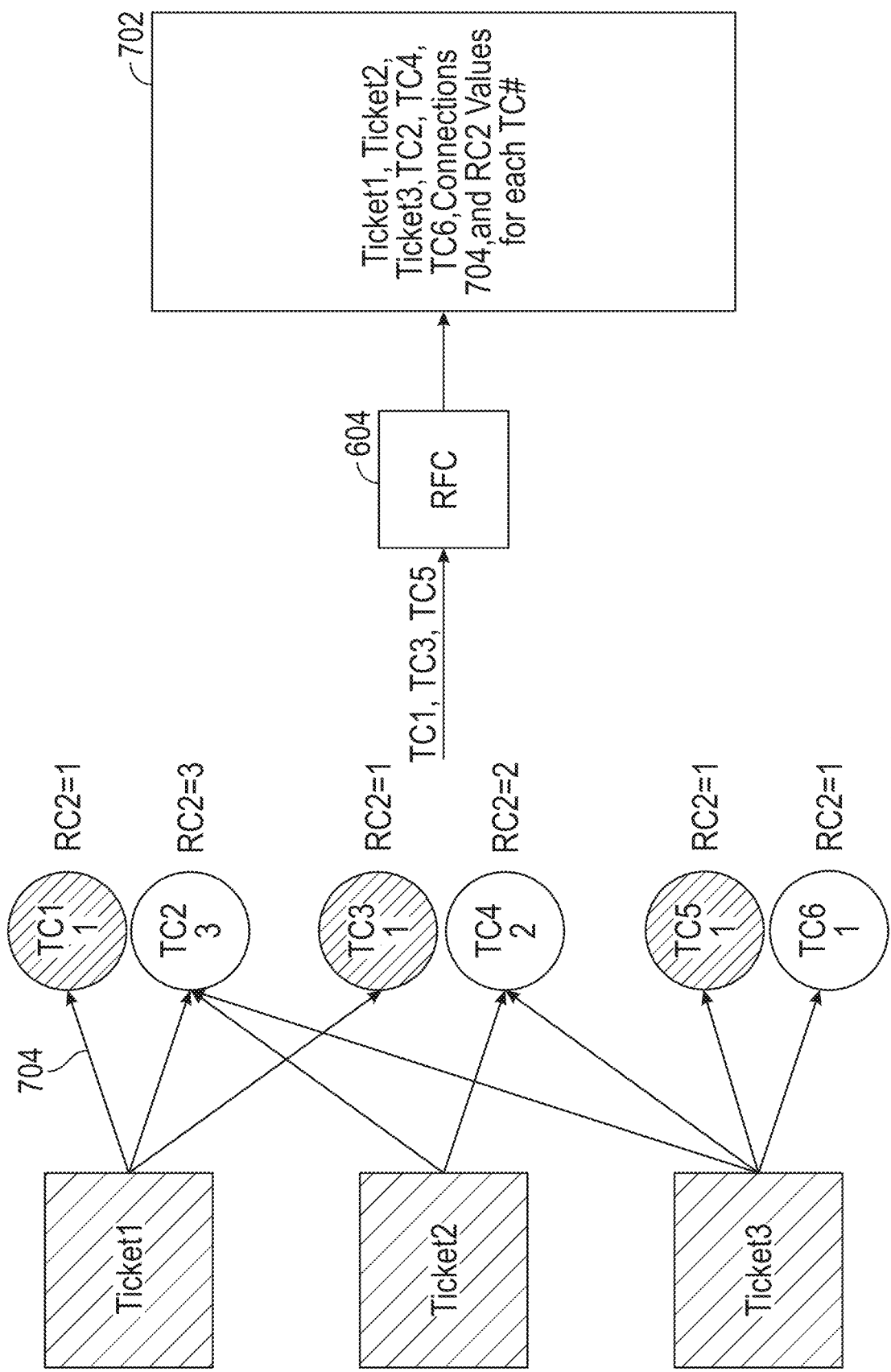

FIG. 7B illustrates example block diagrams of generating relationship counter, RC2, corresponding to ticket linkage count. In this example, input test cases 602 include tests cases TC1, TC3, and TC5. The input test cases can be from phase I results 432. The RFC 604 queries the test case library 106 and determines that the input test cases are linked with tickets, Ticket1, Ticket2, and Ticket3. The ticket connections may have been generated and stored in the test case library 106 because of previous outputs of the TCR module 300 or may have been manually generated in the test case library 106, and/or may have otherwise been previously or historically generated in the test case library 106 through other methods. The tickets, Ticket1, Ticket2, and Ticket3 can yield more test cases, TC2, TC4 and TC6, that were not included in the input test cases TC1, TC3, and TC5.

In this example, after determining related entities tickets Ticket1, Ticket2, Ticket3, test cases TC2, TC4, TC6, and their connections 704, the RFC 604 can generate a relationship counter, RC2, corresponding to ticket linkage count for each test case, including for those that were not in the input, but were later found through connections 704. In the example shown, the relationship counter RC2 for each test case TC # is also shown. The output 702 of the RFC 604, in this example, includes the connected tickets Ticket1, Ticket2, Ticket3, the newly found test cases, TC2, TC4 and TC6, their connections 704, and the relationship counter RC2 for each test case TC #, including test cases, not in the input test cases TC1, TC3, and TC5. The relationship count embedded in RC2 can be summarized as "ticket linkage count."

Figure 7C:
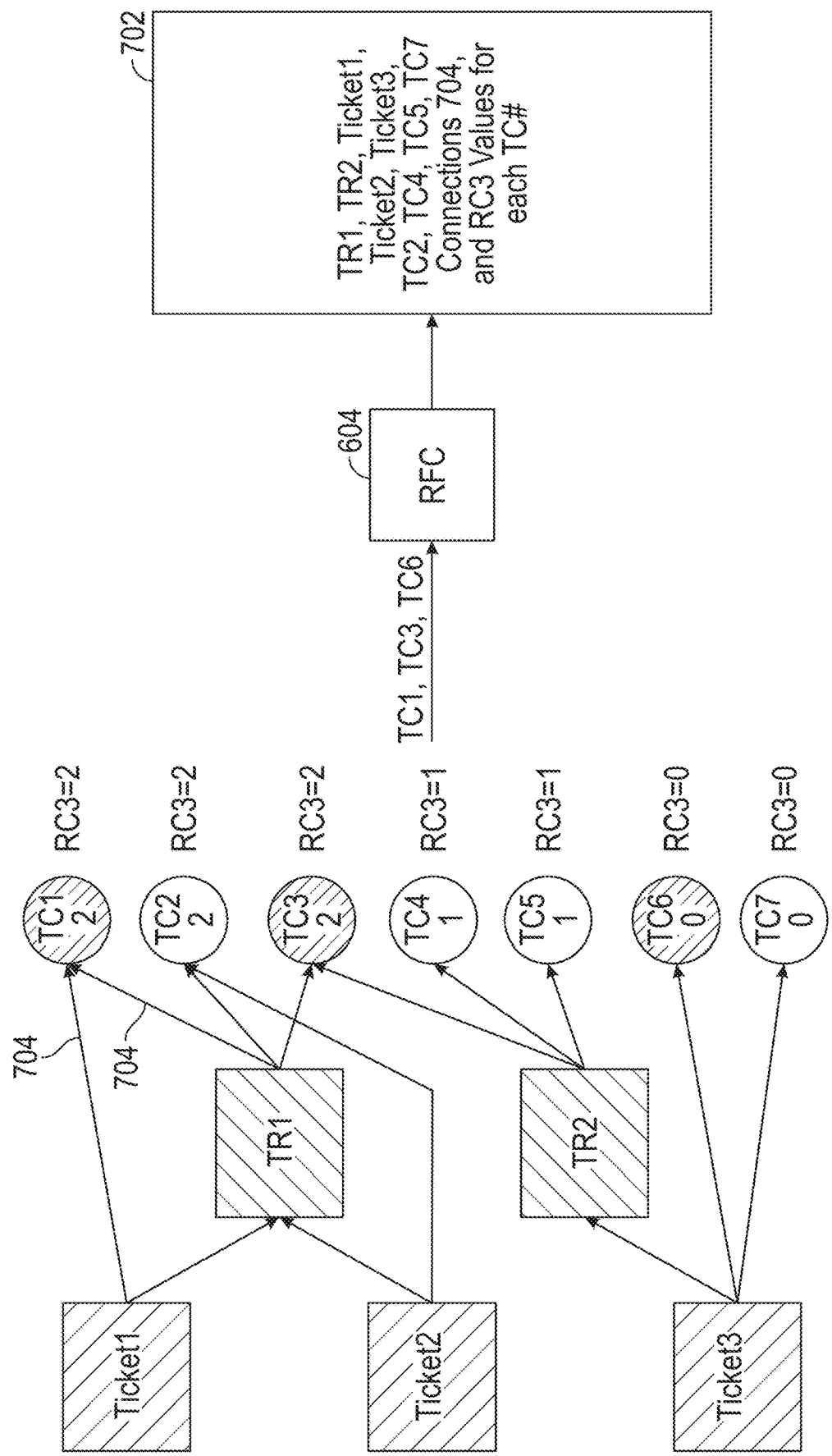

FIG. 7C illustrates example block diagrams of generating relationship counter, RC3, corresponding to a count of the number of continuous connections from a test case to a test run to a ticket. In this example, input test cases 602 include tests cases TC1, TC3, and TC6. The input test cases can be from phase I results 432. The RFC 604 queries the test case library 106 and determines that the input test cases TC1 and TC3 are linked with test run TR1 and the test run TR1 is linked with tickets Ticket 1 and Ticket 2. "Linked" in this context refers to the test run TR1 listing the test case TC1 and TC3, and tickets Ticket1 and Ticket2 both listing the test run TR1. The linkage between these and other entities in the example are illustrated as connections 704. Additional relationships and connections 704 are discovered by querying the test case library 106 and are illustrated. The tickets, test runs, and the connections may have been generated and stored in the test case library 106 because of previous outputs of the TCR module 300 or may have been manually generated in the test case library 106, and/or may have otherwise been previously or historically generated in the test case library 106 through other methods. The test runs TR1, TR2 and tickets, Ticket1, Ticket2, and Ticket3 can yield more test cases, TC2, TC4, TC5 and TC7, that were not included in the input test cases TC1, TC3, and TC6.

In this example, after determining related entities test runs TR1, TR2, tickets Ticket1, Ticket2, Ticket3, and test cases, TC2, TC4, TC5, TC7 and their connections 704, the RFC 604 can generate a relationship counter, RC3, corresponding to a count of continuous links between a ticket, a test run and a test case. The RFC 604 generates the relationship counter RC3 for each test case, including for those that were not in the input, but were later found through connections 704. In the example shown, the relationship counter RC3 for each test case TC # are also shown. For the purposes of the "ticket to test run linkage" relationship count, R3, in the example shown, test cases TC6, and TC7 each have a RC3=0 because their connection is only found through a related ticket (Ticket3), and not through both a test run and a ticket. The output 702 of the RFC 604, in this example, includes the test runs TR1, TR2, the tickets Ticket1, Ticket2, Ticket3, the newly found test cases, TC2, TC4, TC5, and TC7, their connections 704, and the relationship counter RC3 for each test case TC #, including test cases, not in the input test cases TC1, TC3, and TC6. The relationship count embedded in RC3 can be summarized as a "ticket to test run linkage count."

Figure 7D:
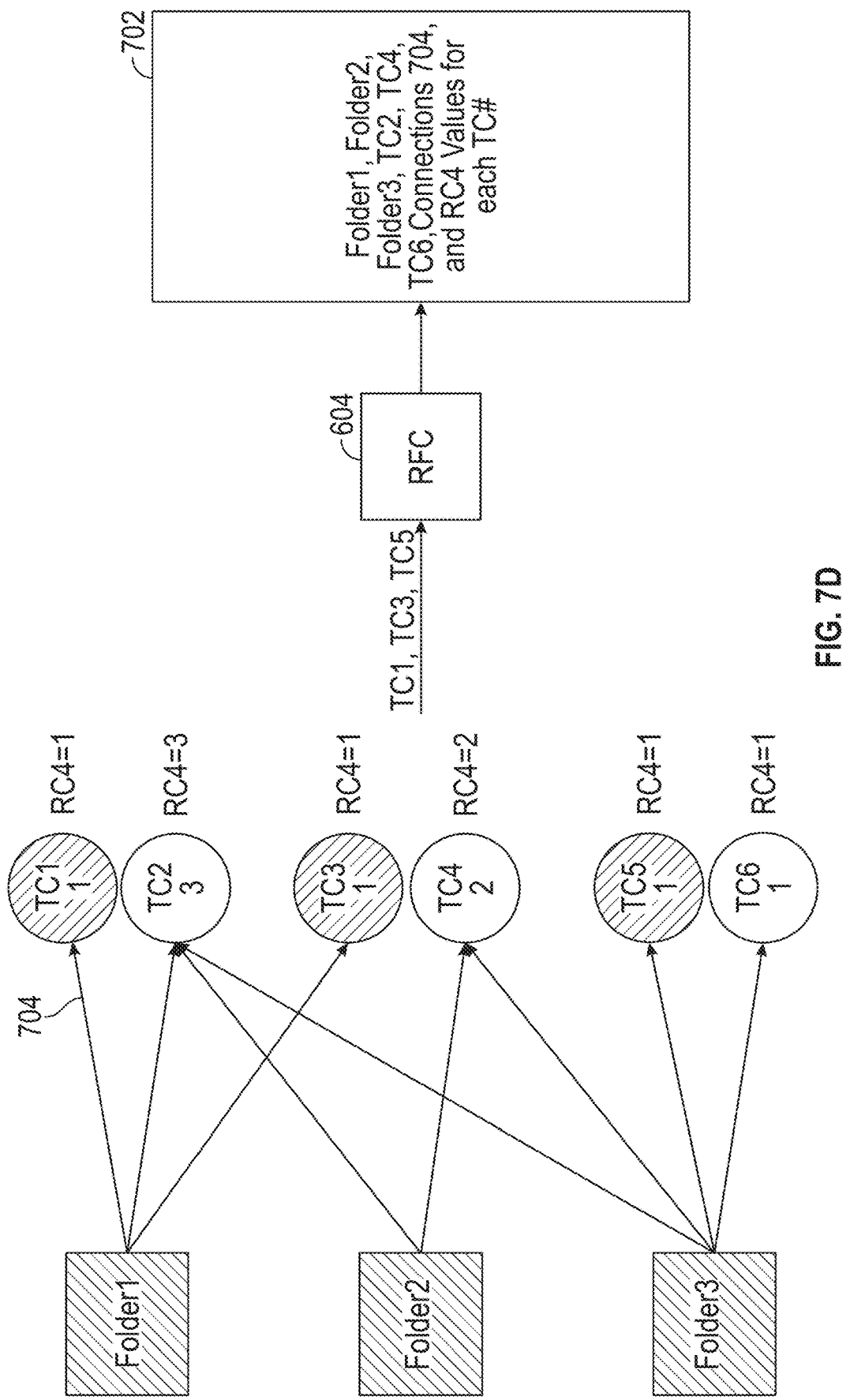

FIG. 7D illustrates example block diagrams of generating a relationship counter, RC4, corresponding to folder linkage count. In this example, input test cases 602 include tests cases TC1, TC3, and TC5. The input test cases can be from phase I results 432. The RFC 604 queries the test case library 106 and determines that the input test cases are linked with folders, Folder1, Folder2, and Folder3. The folder connections may have been generated and stored in the test case library 106 because of previous outputs of the TCR module 300 or may have been manually generated in the test case library 106, and/or may have otherwise been previously or historically generated in the test case library 106 through other methods. The folders, Folder1, Folder2, and Folder3 can yield more test cases, TC2, TC4 and TC6, that were not included in the input test cases TC1, TC3, and TC5.

In this example, after determining related entities Folder1, Folder2, Folder3, test cases TC2, TC4, TC6, and their connections 704, the RFC 604 can generate a relationship counter, RC4, corresponding to folder linkage count for each test case, including for those that were not in the input, but were later found through connections 704. In the example shown, the relationship counter RC4 for each test case TC # are also shown. The output 702 of the RFC 604, in this example, includes the connected Folders Folder1, Folder2, Folder3, the newly found test cases, TC2, TC4 and TC6, their connections 704, and the relationship counter RC4 for each test case TC #, including test cases, not in the input test cases TC1, TC3, and TC5. The relationship count embedded in RC4 can be summarized as a "folder linkage count."

The RFC 604 can generate relationship counters for test cases based on the type of connection of a test case to an input ticket 502. The terms "directly linked" and "indirectly linked" in the context of relationship counters, RC #, refer to the relationship of a test case to an input ticket 502. The input 502 is a ticket in the project management tool 102, from which the user can request automated recommendation of a selection of test cases. "Directly linked" test cases refer to test cases whose connection 704 to the input ticket 502 is not through another entity; instead, the test case is directly connected to the input ticket 502, via a single connection 704. A "direct link" can be due to previous executions of the TCR module 300, manual database entry, historical database entry, and/or through other methods. "Indirectly linked" test cases are test cases whose connections 704 to the input ticket 502 is through another entity, for example a test run, and through second connections 704. An "indirect link" can be due to previous executions of the TCR module 300, manual database entry, historical database entry, and/or through other methods. Whether a test case is directly linked to an input ticket, or indirectly linked to the input ticket, can indicate the degree of relevance of the test case. For example, a test case, which has a previously recorded direct link to an input ticket 502, can be highly relevant to the input ticket 502. Consequently, a test case enjoying a "direct link" connection to the input ticket, can be given more weight when scoring the test cases.

Figure 7E:
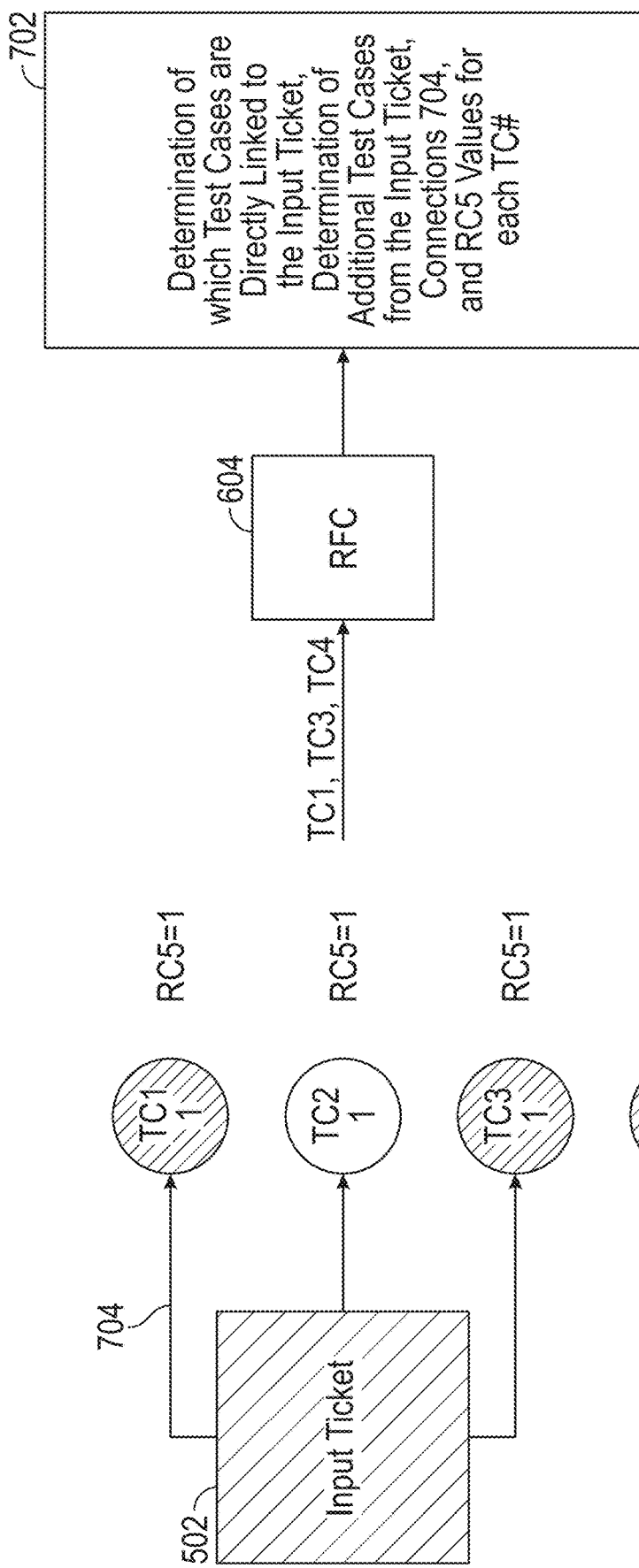

FIG. 7E illustrates example block diagrams of generating a relationship counter, RC5, corresponding to a count of direct link between a test case and an input ticket, such as input ticket 502. The input ticket 502 can be a ticket project from which a user can request the TCR module 300 to suggest or recommend an automated selection of test cases via a UI element. In the example shown, input test cases 602 include tests cases TC1, TC3, and TC4. The input test cases can be from phase I results 432. The RFC 604 queries the test case library 106 and determines whether the input test cases are linked with the input ticket 502. Connections 704 between a test case and the input ticket 502 may have been generated and stored in the test case library 106 because of previous outputs of the TCR module 300 or may have been manually generated in the test case library 106, and/or may have otherwise been previously or historically generated in the test case library 106 through other methods. The input ticket 502 can yield more test cases, for example TC2, which were not included in the input test cases TC1, TC3, and TC4.

In this example, after determining related test cases, and presence or absence of connections 704 to the input ticket 502, the RFC 604 can generate a relationship counter, RC5, for each test case, corresponding to a true or false value for whether a direct link between the test case and the input ticket 502, via a connection 704 has been detected. The RFC 604 generates the relationship counter RC5 for each test case, including for those that were not in the input, but were later found through connections 704. In the example shown, the relationship counter RC5 for each test case TC # is also shown. A value of "1" for RC5 for a test case can indicate the test case is directly linked to the input ticket 502. A value of "0" for RC5 for a test case can indicate no direct connection between the test case and the input ticket 502. The output 702 of the RFC 604, in this example, includes a determination of which test cases have a direct connection to the input ticket 502, a determination of additional test cases from the input ticket, the connections 704, and the relationship counter RC5 for each test case TC #, including test cases, not in the input test cases TC1, TC3, and TC4. The relationship count embedded in RC5 can be summarized as "directly linked test case linkage count."

Figure 7F:
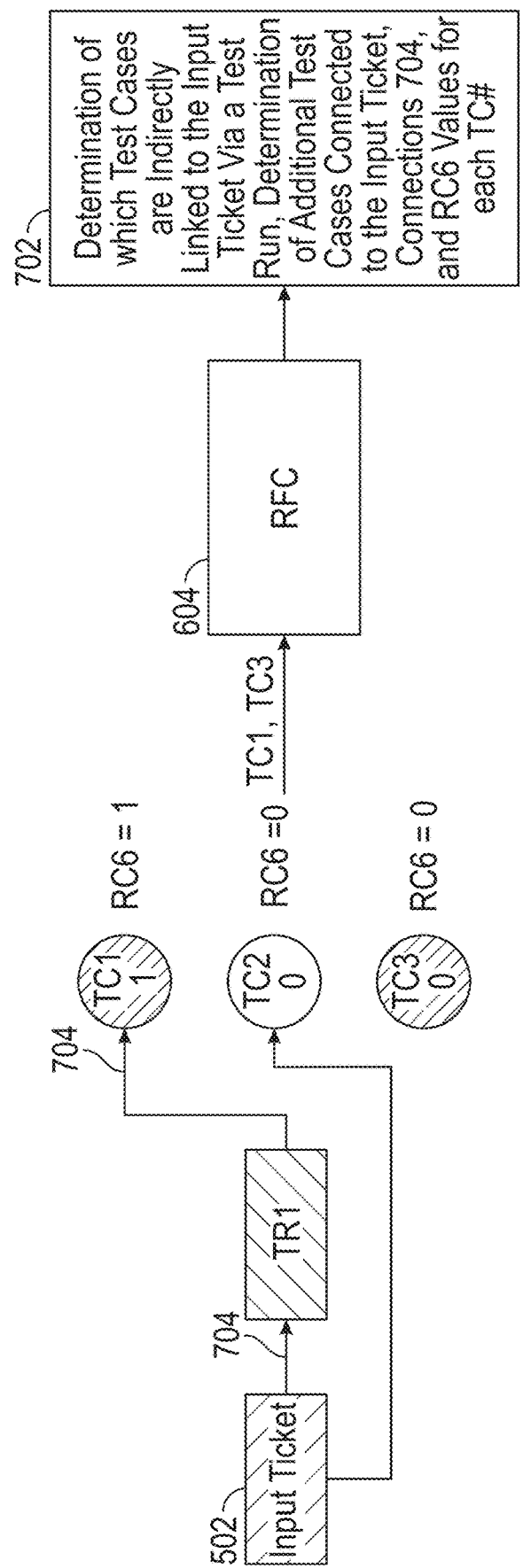

FIG. 7F illustrates example block diagrams of generating a relationship counter, RC6, corresponding to a count of indirect links between test cases and an input ticket, such as input ticket 502. The input ticket 502 can be a ticket project from which a user can request the TCR module 300 to suggest or recommend an automated selection of test cases via a UI element. In the example shown, input test cases 602 include tests cases TC1, and TC3. The input test cases can be from phase I results 432. The RFC 604 queries the test case library 106 and determines whether the input test cases are linked with the input ticket 502 via a test run, which, in turn, is connected to the input ticket 502. In this example, input test case TC1 is connected to the input ticket 502 via a test run TR1, which is also a test run connected to the input ticket 502. Connections 704 between a test case, test run and the input ticket 502 may have been generated and stored in the test case library 106 because of previous outputs of the TCR module 300 or may have been manually generated in the test case library 106, and/or may have otherwise been previously or historically generated in the test case library 106 through other methods. The input ticket 502 can yield more test cases, for example test case TC2, which were not included in the input test cases TC1, and TC3.

In this example, after determining related test cases, and presence or absence of connections 704 to the input ticket 502, the RFC 604 can generate a relationship counter, RC6, for each test case, corresponding to a true or false value for whether an indirect link between the test case and the input ticket 502, via a connection 704 through a test run, has been detected. The RFC 604 generates the relationship counter RC6 for each test case, including for those that were not in the input, but were later found through connections 704. In the example shown, the relationship counter RC6 for each test case TC # is also shown. A value of "1" for RC6 for a test case can indicate the test case is indirectly linked to the input ticket 502. A value of "O" for RC6 for a test case can indicate no indirect link between the test case and the input ticket 502. The output 702 of the RFC 604, in this example, includes a determination of which test cases have an indirect link to the input ticket 502, a determination of additional test cases from the input ticket, the connections 704, and the relationship counter RC6 for each test case TC #, including test cases, not in the input test cases TC1, and TC3. The relationship count embedded in RC6 can be summarized as "indirectly linked test case linkage count."

In some embodiments, the RFC 604 uses phase I results 432, as input, to generate the relationship counters RC1-RC6, the directly linked test cases, as input, to generate relationship counters RC7, RC8, and indirectly linked test cases, as input, to generate the relationship counters, RC9-RC11.

Figure 8A:
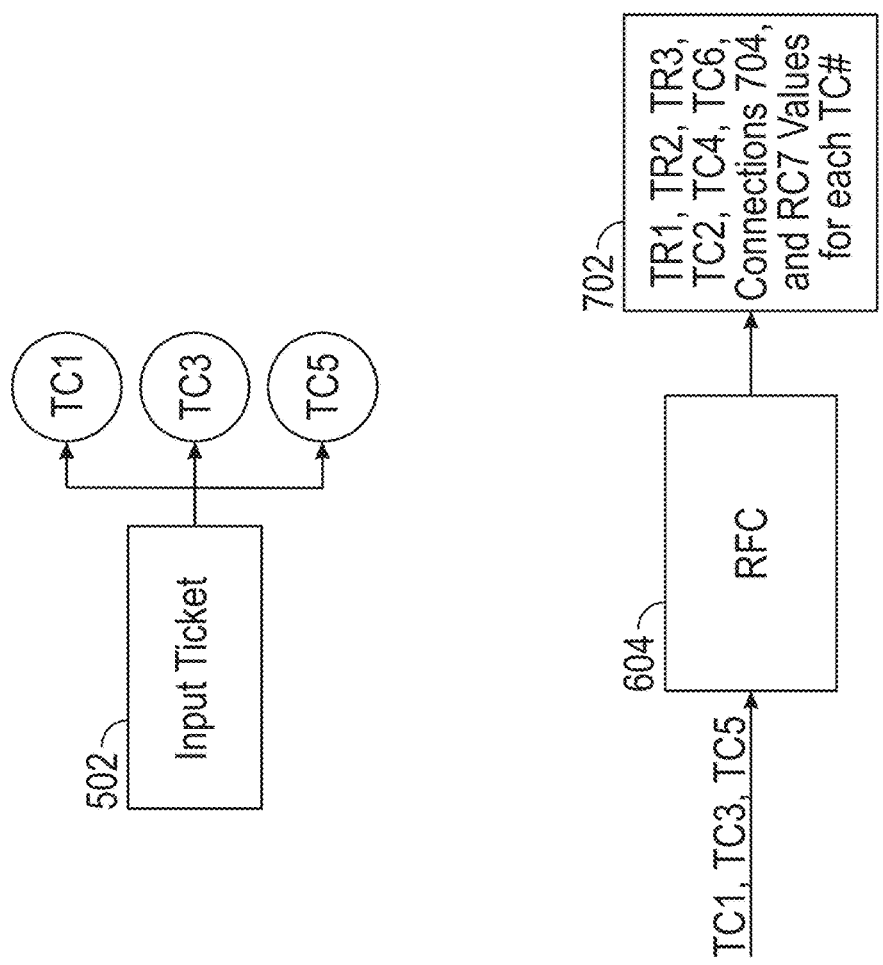
Figure 8A:
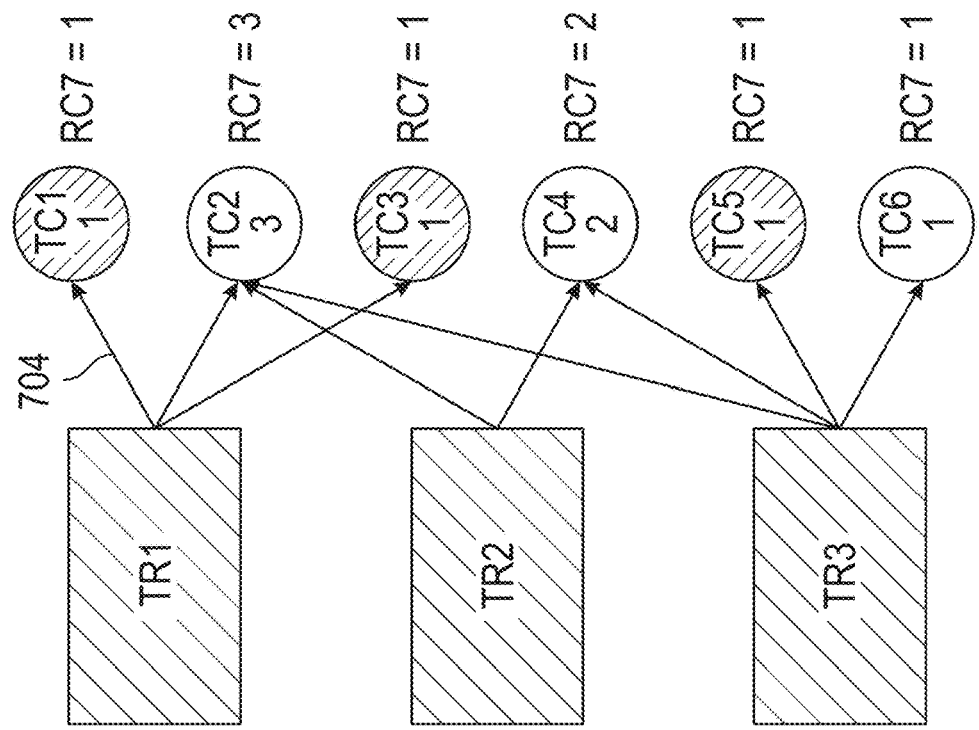

FIG. 8A illustrates block diagrams related to the RFC 604 using directly linked test cases TC1, TC3 and TC5, as input, to find test runs TR1, TR2, TR3, additional test cases TC2, TC4, TC6, connections 704 and to generate relationship counter RC7 values for each test case. The relationship count embedded in RC7 is a "test run linkage count" with directly linked input cases as input to the RFC 604.

Figure 8B:
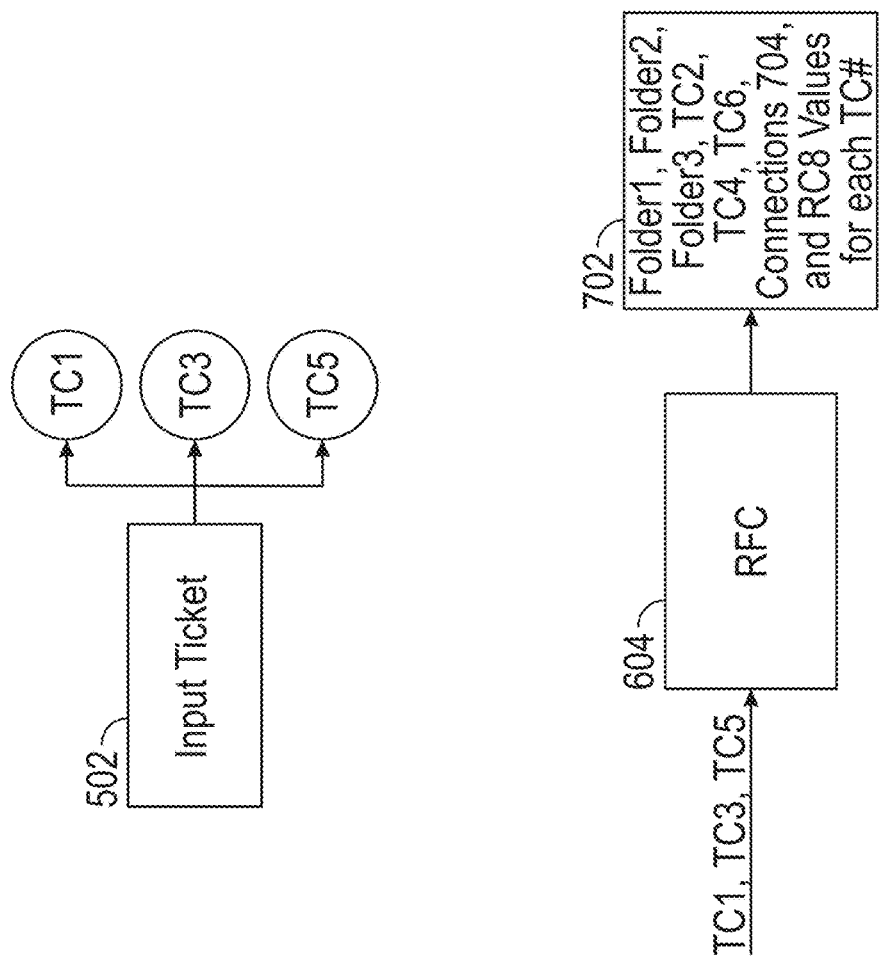
Figure 8B:
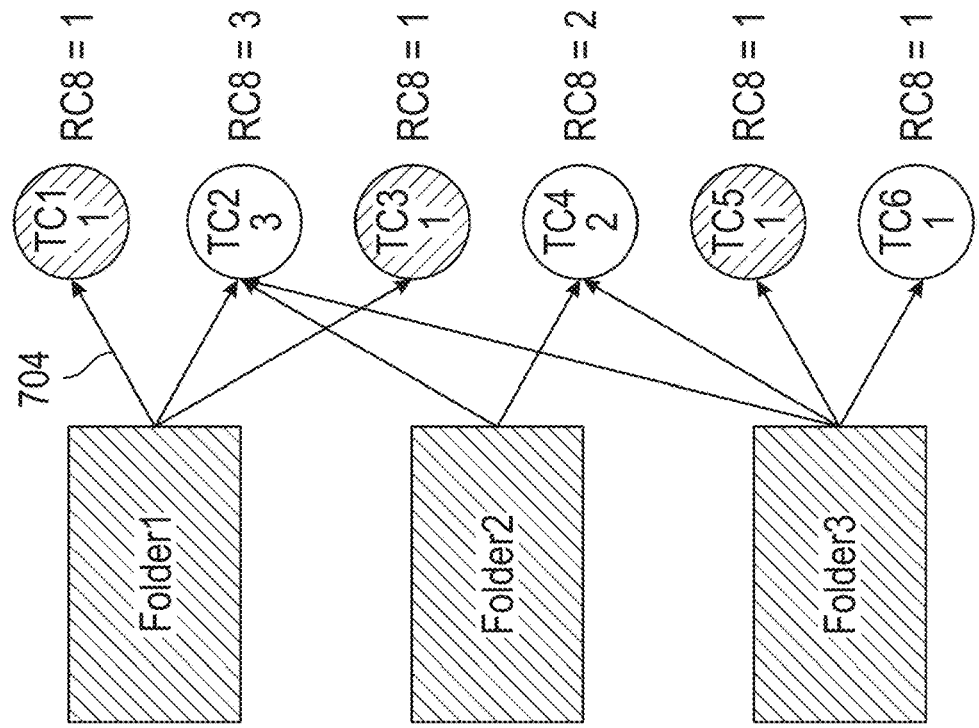

FIG. 8B illustrates block diagrams related to the RFC 604 using directly linked test cases TC1, TC3 and TC5, as input, to find folders Folder1, Folder2, Folder3, additional test cases TC2, TC4, TC6, connections 704 and to generate relationship counter RC8 values for each test case. The relationship count embedded in RC8 is a "folder linkage count" with directly linked input cases as input to the RFC 604.

Figure 8C:
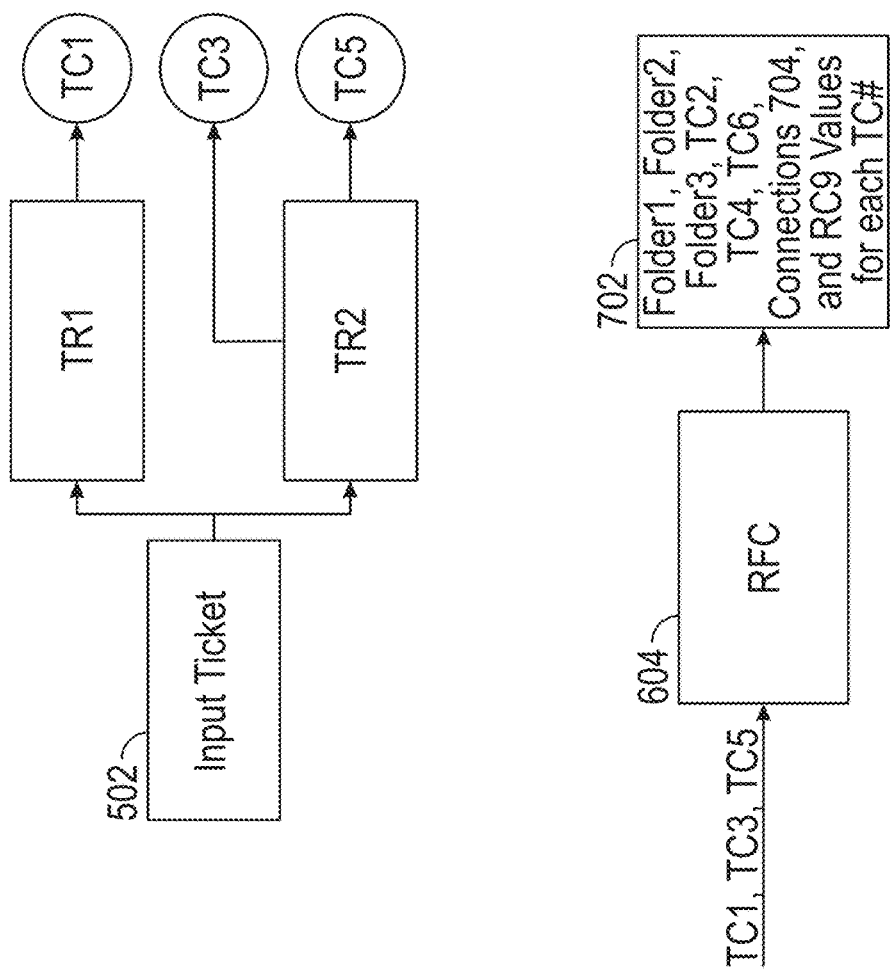
Figure 8C:
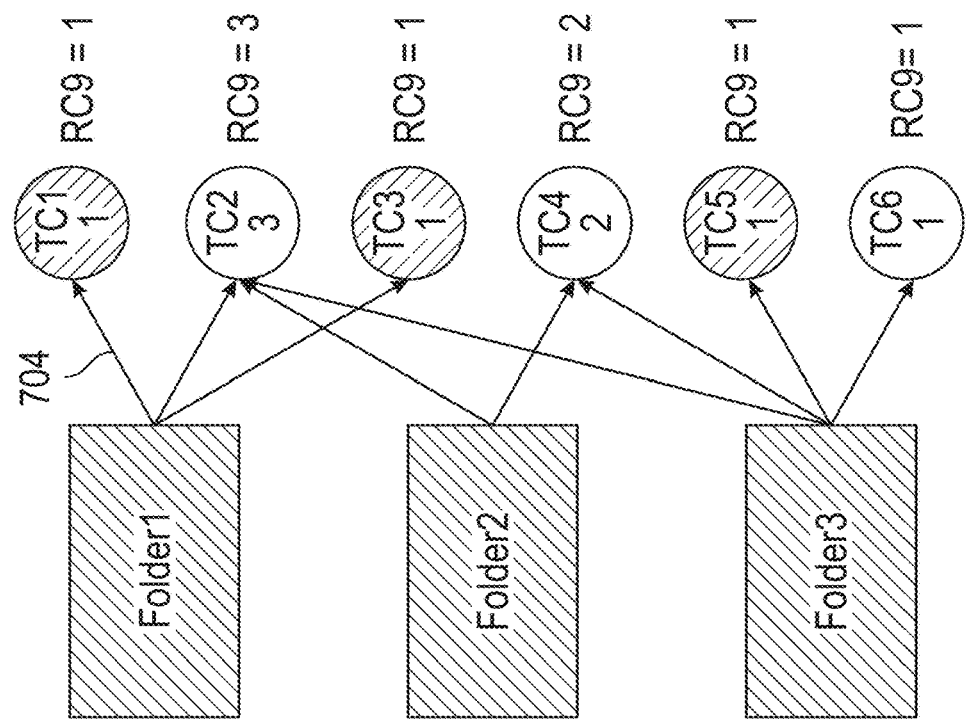

FIG. 8C illustrates block diagrams related to the RFC 604 using indirectly linked test cases TC1, TC3 and TC5, as input, to find folders Folder1, Folder2, Folder3, additional test cases TC2, TC4, TC6, connections 704 and to generate relationship counter RC9 values for each test case. The relationship count embedded in RC9 is a "folder linkage count" with indirectly linked input cases as input to the RFC 604.

Figure 8D:
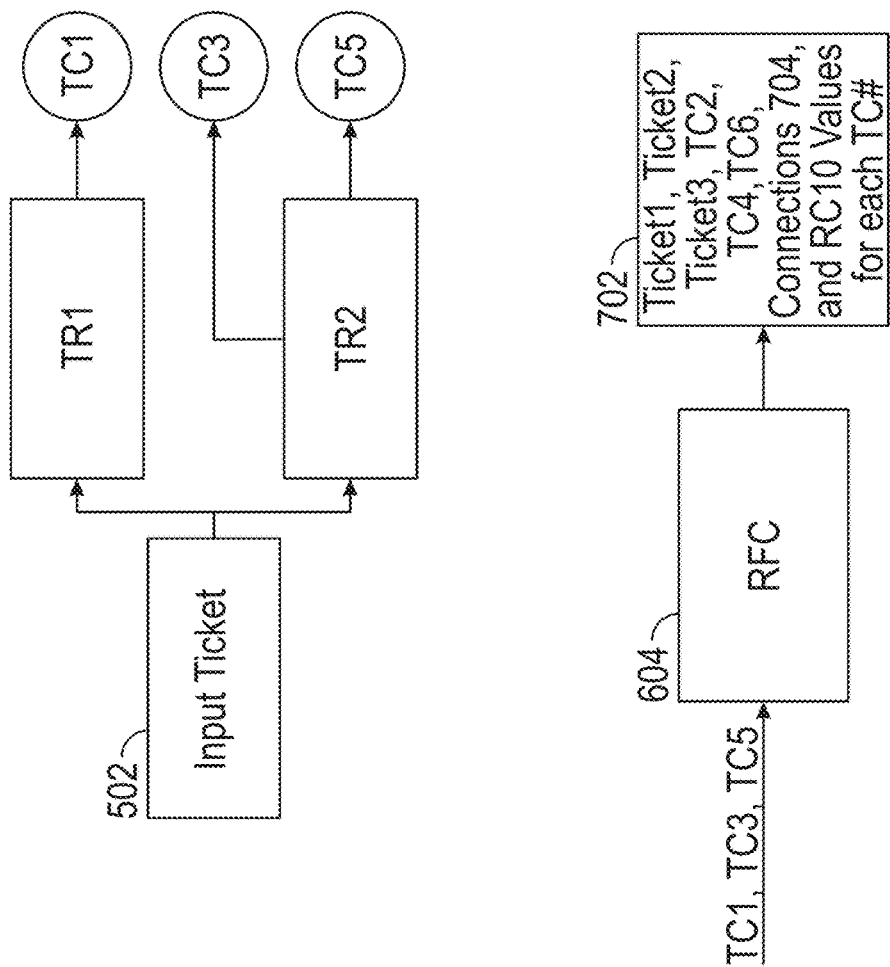
Figure 8D:
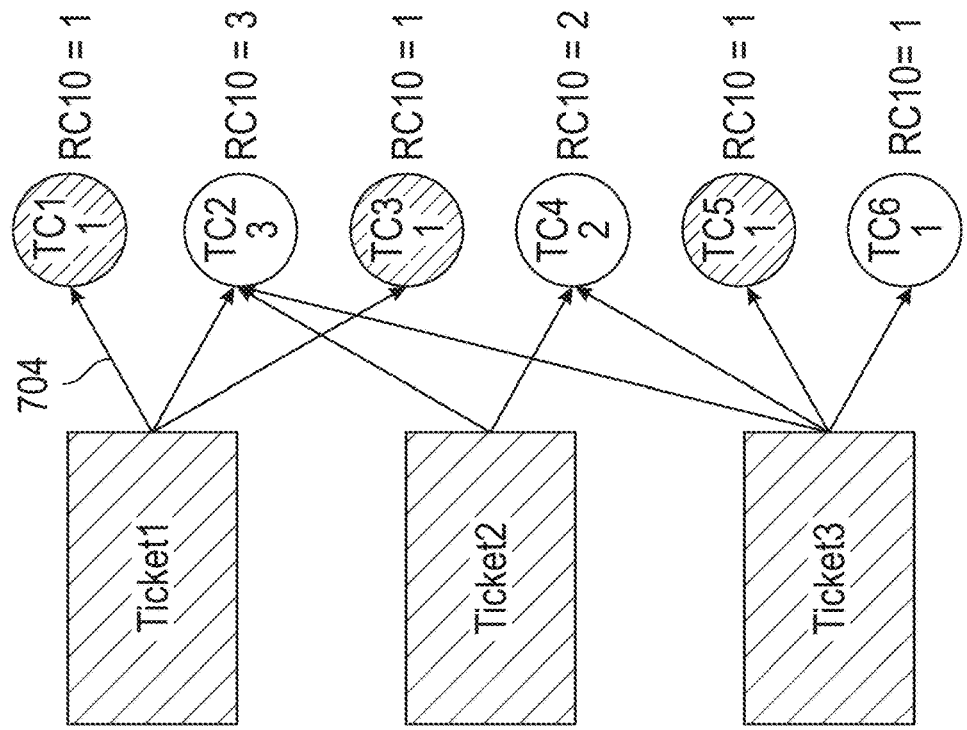

FIG. 8D illustrates block diagrams related to the RFC 604 using indirectly linked test cases TC1, TC3 and TC5, as input, to find folders Ticket1, Ticket2, Ticket3, additional test cases TC2, TC4, TC6, connections 704 and to generate relationship counter RC10 values for each test case. The relationship count embedded in RC10 is a "ticket linkage count" with indirectly linked input cases as input to the RFC 604.

Figure 8E:
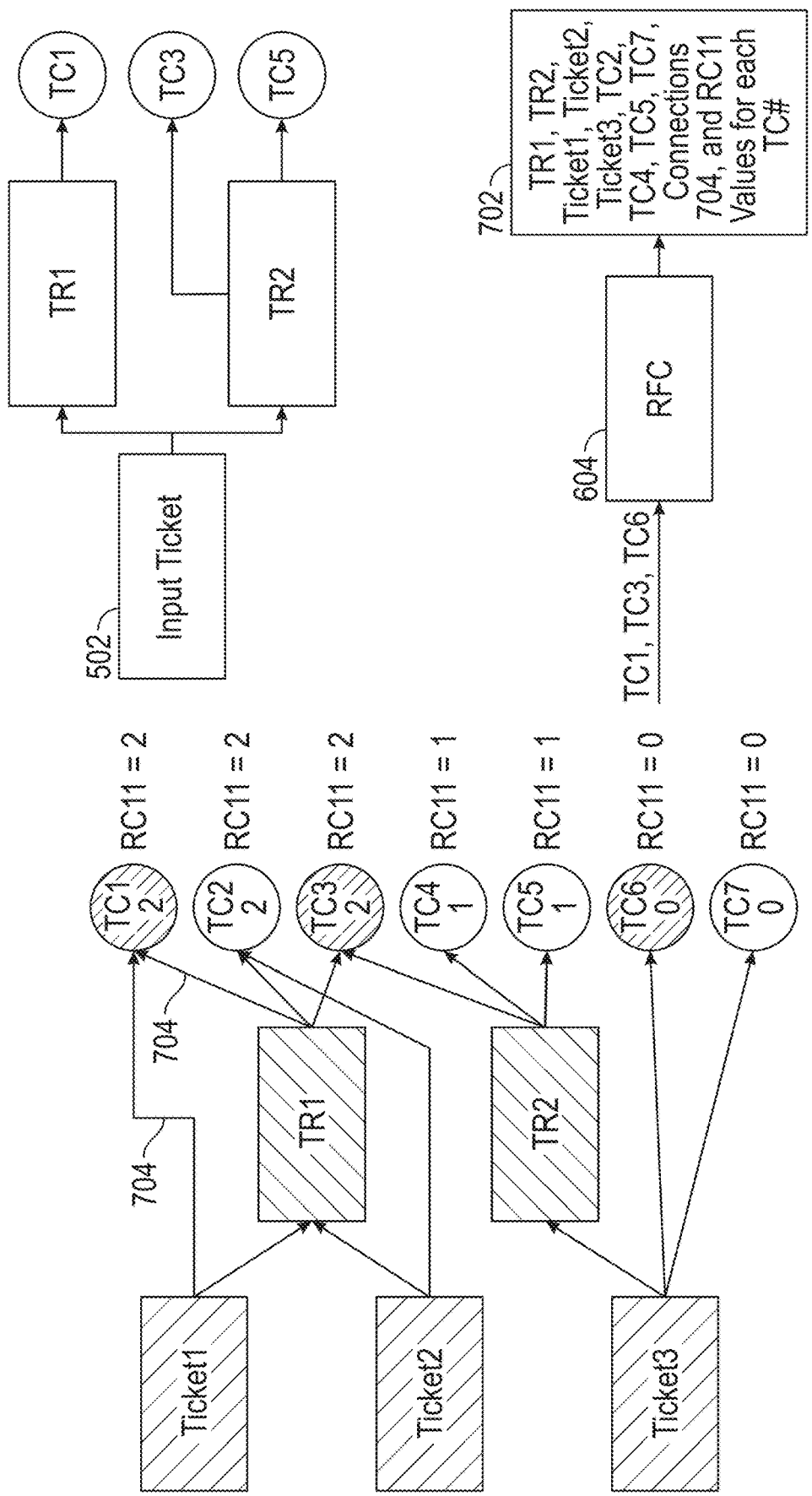

FIG. 8E illustrates block diagrams related to the RFC 604 using indirectly linked test cases TC1, TC3 and TC5, as input, to find folders test runs TR1, TR2, tickets Ticket1, Ticket2, Ticket3, additional test cases TC2, TC4, TC5, TC7, connections 704 and to generate relationship counter RC11 values for each test case. The relationship count embedded in RC11 is a "ticket to test run linkage count" with indirectly linked input cases as input to the RFC 604.

The above relationship parameters are provided as examples only. Persons of ordinary skill in the art can configure the RFC 604 to generate additional relationship counters, without departing from the spirit of the disclosed technology.

The described embodiments can be deployed to improve the efficiency of test case databases, such as the test case library 106. Without the advantage of the described embodiments, developers rely on manual methods of creating organization, keyword searching, prior institutional or personal knowledge and similarly inefficient methods of querying the test case library 106 for relevant test cases.

Figure 9:
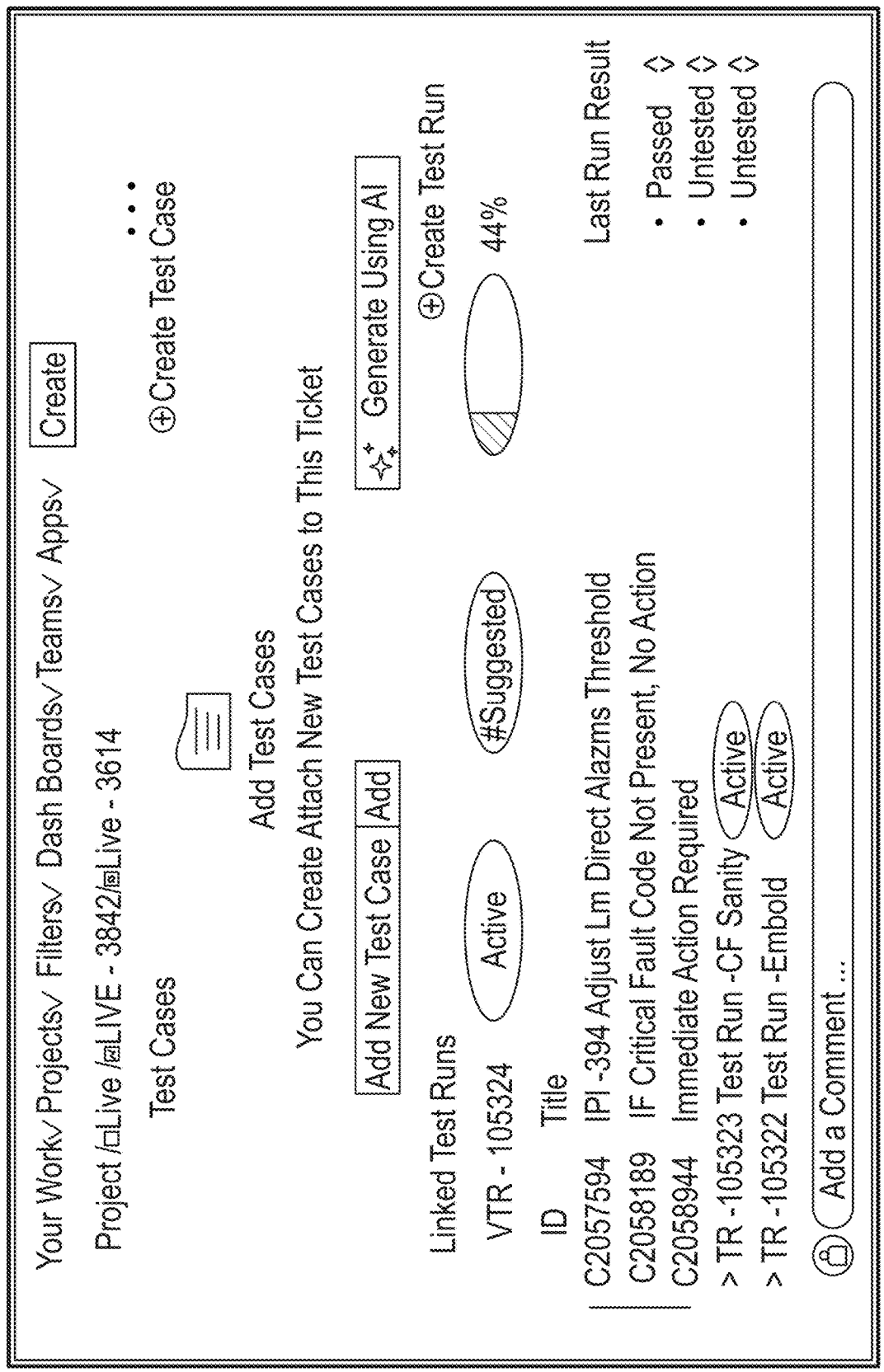
FIG. 9 illustrates a diagram of one or more example user interface elements of a combined project management tool and test case management tool.

FIG. 9 illustrates a diagram 900 of one or more example user interface elements of a combined project management tool and test case management tool. The diagram 900 can be a screenshot of an input ticket 502. The illustrated user interface elements are supported by backend operations according to the described embodiments and other features of the project management tool and the test case management tool. In the "test cases" section of a ticket project, the user has access to a button "Add test cases," which can be used to manually add a new test case from scratch or from a selection obtained from the test case library 106. The user also has access to a button, "Generate using AI," which triggers the TCR module 300 and other described embodiments to generate a selection of recommended test cases for the ticket project. The recommended test cases can be presented as one or more test runs. An expansion arrow UI element can expand a test run to reveal the test cases in the test run and other project management details related to each test case. The user can view an overall progress of a test run and select progress indication buttons, such "PASSED," "FAILED," "UNTESTED," etc. next to each test case. A comment section can allow team members to comment on a ticket project and the underlying test cases and test runs.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
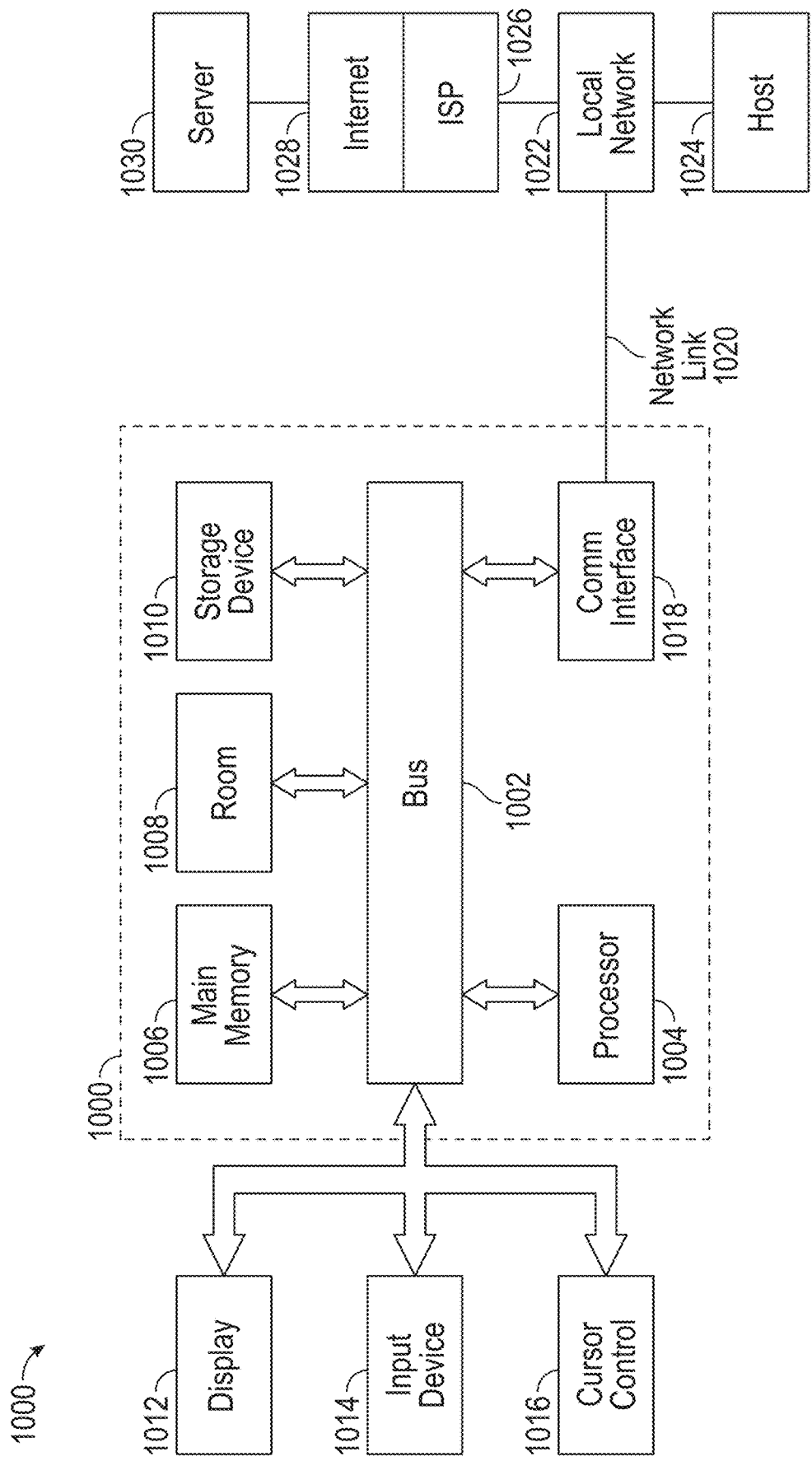
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touch-screen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples. Examples Related to Automatic AI-Based Test Case Selection and Recommendation Example 1: A method comprising: integrating in a project management tool a test case management tool, the integration comprising generating test case management tool user interface elements in the project management tool; receiving a plurality of test cases via the user interface element of the test case management tool, each test case comprising a plurality of test case fields and keywords, wherein the keywords are generated by or in the project management tool and/or the test case management tool as identifier of an issue; storing the test cases and the associated fields for each test case in a test case library database, wherein each test case and test case associated fields are stored as records in the test case library database, the database comprising a database management system (DBMS) configured to provide an application programming interface (API) to the test case library database for interfacing with the database, including sending, receiving and querying records to and from the database; receiving, with a first application layer and via the DBMS, a plurality of test cases from the test case library database; the first application layer, placing the plurality of the test cases in a first job queue; a test case worker, interfacing with a text-to-vector embedder, receiving the plurality of the test cases from the first job queue, vectorizing, with the text-to-vector embedder, the test cases, and providing the vectorized test cases to a large language model (LLM); the test case worker, issuing a first prompt to the large language model (LLM) to generate a summary of each vectorized test case, each summary comprising data embedded in the fields of each test case, the first prompt comprising a first prompt configuration file, comprising a selection of models, model performance parameters, and a method of finding summary comprising an instruction to preserve the keywords in each test case; storing the test case summaries in a test case summary database; at runtime, receiving, via the test case management tool user interface elements integrated in the project management tool, a user selection of a request to generate a selection of test cases for a ticket; receiving, with a second application layer, ticket data associated with the ticket, from the project management tool, the ticket data, comprising ticket fields and ticket keywords; the second application layer, placing the ticket data in a second job queue; a ticket worker, interfacing with the large language model, providing the ticket data from the second job queue to the large language model; the ticket worker, issuing a second prompt to the large language model, the second prompt comprising a second prompt configuration file, comprising a selection of models, model performance parameters, and a method of finding summary comprising an instruction to preserve the keywords in the ticket data; the large language model, providing a ticket summary to a search module; the search module, semantic searching the ticket summary against the test case summary database; the search module returning test case identifiers of test cases in the test case summary database semantically matching with the ticket summary; retrieving the matched test cases from the test case library database, using the test case identifiers; and displaying the matched test cases via a user interface element of the test case management tool integrated in the project management tool.

Example 2: The method of Example 1, wherein ticket data comprises data on additionally linked tickets.

Example 3: The method of some or all of Examples 1 and 2, wherein the integrating of the test case management tool into the project management tool is via a plugin.

Example 4: The method of some or all of Examples 1-3, wherein the project management tool comprises Atlassian® Jira®.

Example 5: The method of some or all of Examples 1-4, further comprising: identifying additional test cases, based in part on the matched test cases; generating a plurality of relationship counters for each test case; generating a score for each test case, based at least in part on the relationship counters; and displaying a selection of the test cases, having scores above a threshold.

Example 6: The method of some or all of Examples 1-5, wherein the matched test cases comprise a first phase test cases, wherein the relationship counters comprise one or more counts of linkage between a first phase test case, a test run, a folder, a ticket, and/or the input ticket.

Example 7: The method of some or all of Examples 1-6, further comprising: querying the test case library database for relationships recorded in the test case library database with the matched test cases; and finding additional test cases relevant to the input ticket, based at least in part on the relationships retrieved from the test case library database.

Example 8: A non-transitory computer storage medium that stores executable program instructions that, when executed by one or more computing devices, configure the one or more computing devices to perform operations comprising: integrating in a project management tool a test case management tool, the integration comprising generating test case management tool user interface elements in the project management tool; receiving a plurality of test cases via the user interface element of the test case management tool, each test case comprising a plurality of test case fields and keywords, wherein the keywords are generated by or in the project management tool and/or the test case management tool as identifier of an issue; storing the test cases and the associated fields for each test case in a test case library database, wherein each test case and test case associated fields are stored as records in the test case library database, the database comprising a database management system (DBMS) configured to provide an application programming interface (API) to the test case library database for interfacing with the database, including sending, receiving and querying records to and from the database; receiving, with a first application layer and via the DBMS, a plurality of test cases from the test case library database; the first application layer, placing the plurality of the test cases in a first job queue; a test case worker, interfacing with a text-to-vector embedder, receiving the plurality of the test cases from the first job queue, vectorizing, with the text-to-vector embedder, the test cases, and providing the vectorized test cases to a large language model (LLM); the test case worker, issuing a first prompt to the large language model (LLM) to generate a summary of each vectorized test case, each summary comprising data embedded in the fields of each test case, the first prompt comprising a first prompt configuration file, comprising a selection of models, model performance parameters, and a method of finding summary comprising an instruction to preserve the keywords in each test case; storing the test case summaries in a test case summary database; at runtime, receiving, via the test case management tool user interface elements integrated in the project management tool, a user selection of a request to generate a selection of test cases for a ticket; receiving, with a second application layer, ticket data associated with the ticket, from the project management tool, the ticket data, comprising ticket fields and ticket keywords; the second application layer, placing the ticket data in a second job queue; a ticket worker, interfacing with the large language model, providing the ticket data from the second job queue to the large language model; the ticket worker, issuing a second prompt to the large language model, the second prompt comprising a second prompt configuration file, comprising a selection of models, model performance parameters, and a method of finding summary comprising an instruction to preserve the keywords in the ticket data; the large language model, providing a ticket summary to a search module; the search module, semantic searching the ticket summary against the test case summary database; the search module returning test case identifiers of test cases in the test case summary database semantically matching with the ticket summary; retrieving the matched test cases from the test case library database, using the test case identifiers; and displaying the matched test cases via a user interface element of the test case management tool integrated in the project management tool.

Example 9: The non-transitory computer storage of Example 8, wherein ticket data comprises data on additionally linked tickets.

Example 10: The non-transitory computer storage of some or all of Examples 8 and 9, wherein the integrating of the test case management tool into the project management tool is via a plugin.

Example 11: The non-transitory computer storage of some or all of Examples 8-10, wherein the project management tool comprises Atlassian® Jira®.

Example 12: The non-transitory computer storage of some or all of Examples 8-11, wherein the operations further comprise: identifying additional test cases, based in part on the matched test cases; generating a plurality of relationship counters for each test case; generating a score for each test case, based at least in part on the relationship counters; and displaying a selection of the test cases, having scores above a threshold.

Example 13: The non-transitory computer storage of some or all of Example 8-12, wherein the matched test cases comprise a first phase test cases, wherein the relationship counters comprise one or more counts of linkage between a first phase test case, a test run, a folder, a ticket, and/or the input ticket.

Example 14: The non-transitory computer storage of some or all of Examples 8-13, wherein the operations further comprise: querying the test case library database for relationships recorded in the test case library database with the matched test cases; and finding additional test cases relevant to the input ticket, based at least in part on the relationships retrieved from the test case library database.

Example 15: A system comprising one or more processors, wherein the one or more processors are configured to perform operations comprising: integrating in a project management tool a test case management tool, the integration comprising generating test case management tool user interface elements in the project management tool; receiving a plurality of test cases via the user interface element of the test case management tool, each test case comprising a plurality of test case fields and keywords, wherein the keywords are generated by or in the project management tool and/or the test case management tool as identifier of an issue; storing the test cases and the associated fields for each test case in a test case library database, wherein each test case and test case associated fields are stored as records in the test case library database, the database comprising a database management system (DBMS) configured to provide an application programming interface (API) to the test case library database for interfacing with the database, including sending, receiving and querying records to and from the database; receiving, with a first application layer and via the DBMS, a plurality of test cases from the test case library database; the first application layer, placing the plurality of the test cases in a first job queue; a test case worker, interfacing with a text-to-vector embedder, receiving the plurality of the test cases from the first job queue, vectorizing, with the text-to-vector embedder, the test cases, and providing the vectorized test cases to a large language model (LLM); the test case worker, issuing a first prompt to the large language model (LLM) to generate a summary of each vectorized test case, each summary comprising data embedded in the fields of each test case, the first prompt comprising a first prompt configuration file, comprising a selection of models, model performance parameters, and a method of finding summary comprising an instruction to preserve the keywords in each test case; storing the test case summaries in a test case summary database; at runtime, receiving, via the test case management tool user interface elements integrated in the project management tool, a user selection of a request to generate a selection of test cases for a ticket; receiving, with a second application layer, ticket data associated with the ticket, from the project management tool, the ticket data, comprising ticket fields and ticket keywords; the second application layer, placing the ticket data in a second job queue; a ticket worker, interfacing with the large language model, providing the ticket data from the second job queue to the large language model; the ticket worker, issuing a second prompt to the large language model, the second prompt comprising a second prompt configuration file, comprising a selection of models, model performance parameters, and a method of finding summary comprising an instruction to preserve the keywords in the ticket data; the large language model, providing a ticket summary to a search module; the search module, semantic searching the ticket summary against the test case summary database; the search module returning test case identifiers of test cases in the test case summary database semantically matching with the ticket summary; retrieving the matched test cases from the test case library database, using the test case identifiers; and displaying the matched test cases via a user interface element of the test case management tool integrated in the project management tool.

Example 16: The system of Example 15, wherein the integrating of the test case management tool into the project management tool is via a plugin.

Example 17: The system of some or all of Examples 15 and 16, wherein the project management tool comprises Atlassian® Jira®.

Example 18: The system of some or all of Examples 15-17, wherein the operations further comprise: identifying additional test cases, based in part on the matched test cases; generating a plurality of relationship counters for each test case; generating a score for each test case, based at least in part on the relationship counters; and displaying a selection of the test cases, having scores above a threshold.

Example 19: The system of some or all of Examples 15-18, wherein the matched test cases comprise a first phase test cases, wherein the relationship counters comprise one or more counts of linkage between a first phase test case, a test run, a folder, a ticket, and/or the input ticket.

Example 20: The system of some or all of Examples 15-19, wherein the operations further comprise: querying the test case library database for relationships recorded in the test case library database with the matched test cases; and finding additional test cases relevant to the input ticket, based at least in part on the relationships retrieved from the test case library database.

Examples Related to Improved Automatic AI-Based Test Case Selection and Recommendation, Using Relationship Counters Example 21: A method comprising: integrating a test case management tool in a project management tool; the combined project management tool and test case management tool, coupled to a test case library database, the test case library database comprising tickets, test cases, folders and test runs and connections between the test cases, the tickets, the folders, and the test runs; during background operations, and with a large language model, summarizing the test cases in the test case library; storing the summarized test cases in a test case summary database; providing a user interface element of the test case management tool in a project management tool, the user interface element configured to receive a user request for recommendation of a selection of test cases for an input ticket; receiving ticket data; with the large language model, summarizing the ticket data; semantic searching the summarized ticket data against the test case summary database; generating first phase results from the matches obtained from the semantic searching, the first phase results, comprising a selection of test cases; a relationship finder and counter, receiving the first phase test cases, querying the test case library database for related entities to the first phase test cases; detecting a first set of additional test cases, based on the detected related entities, and generating a first group of relationship counters for the first phase test cases and the first set of additional test cases; the relationship finder and counter, receiving the input ticket; querying the test case database for test cases related to the input ticket; detecting a second set of additional test cases, based on the detected related entities; generating a second group of relationship counters for the test cases related to the input ticket and the second set of additional test cases; a scorer, generating a score for each test case, based at least partly on the first group of relationship counters and the second group of relationship counters; selecting a presentation group of test cases, based at least partly on the scores for the test cases; and displaying the presentation group of test cases in the user interface element.

Example 22: The method of Example 21, wherein generating the scores further comprises: generating a weighted average of the relationship counters.

Example 23: The method of some or all of Examples 21 and 22, wherein the first group of relationship counters comprise a plurality of counts of linkages between test runs, first phase test cases, folders and test runs.

Example 24: The method of some or all of Examples 21-23, wherein the second group of relationship counters comprise plurality of counts of linkages between the test cases related to the input ticket and the folders, and test runs.

Example 25: The method of some or all of Examples 21-24, wherein one or more relationship counters are at least in part based on a count of linkages of test cases directly linked to the input ticket.

Example 26: The method of some or all of Examples 21-25, wherein one or more relationship counters are at least in part based on a count of linkages of test cases indirectly linked to the input ticket.

Example 27: The method of some or all of Examples 21-26, wherein selecting the presentation group comprises determining a selection of test cases having scores above a threshold percentile.

Example 28: A non-transitory computer storage medium that stores executable program instructions that, when executed by one or more computing devices, configure the one or more computing devices to perform operations comprising: integrating a test case management tool in a project management tool; the combined project management tool and test case management tool, coupled to a test case library database, the test case library database comprising tickets, test cases, folders and test runs and connections between the test cases, the tickets, the folders, and the test runs; during background operations, and with a large language model, summarizing the test cases in the test case library; storing the summarized test cases in a test case summary database; providing a user interface element of the test case management tool in a project management tool, the user interface element configured to receive a user request for recommendation of a selection of test cases for an input ticket; receiving ticket data; with the large language model, summarizing the ticket data; semantic searching the summarized ticket data against the test case summary database; generating first phase results from the matches obtained from the semantic searching, the first phase results, comprising a selection of test cases; a relationship finder and counter, receiving the first phase test cases, querying the test case library database for related entities to the first phase test cases; detecting a first set of additional test cases, based on the detected related entities, and generating a first group of relationship counters for the first phase test cases and the first set of additional test cases; the relationship finder and counter, receiving the input ticket; querying the test case database for test cases related to the input ticket; detecting a second set of additional test cases, based on the detected related entities; generating a second group of relationship counters for the test cases related to the input ticket and the second set of additional test cases; a scorer, generating a score for each test case, based at least partly on the first group of relationship counters and the second group of relationship counters; selecting a presentation group of test cases, based at least partly on the scores for the test cases; and displaying the presentation group of test cases in the user interface element.

Example 29: The non-transitory computer storage of Example 28, wherein generating the scores further comprises: generating a weighted average of the relationship counters.

Example 30: The non-transitory computer storage of some or all of Examples 28 and 29, wherein the first group of relationship counters comprise a plurality of counts of linkages between test runs, first phase test cases, folders and test runs.

Example 31: The non-transitory computer storage of some or all of Examples 28-30, wherein the second group of relationship counters comprise plurality of counts of linkages between the test cases related to the input ticket and the folders, and test runs.

Example 32: The non-transitory computer storage of some or all of Examples 28-31, wherein one or more relationship counters are at least in part based on a count of linkages of test cases directly linked to the input ticket.

Example 33: The non-transitory computer storage of some or all of Examples 28-32, wherein one or more relationship counters are at least in part based on a count of linkages of test cases indirectly linked to the input ticket.

Example 34: The non-transitory computer storage of some or all of Examples 28-33, wherein selecting the presentation group comprises determining a selection of test cases having scores above a threshold percentile.

Example 35: A system comprising one or more processors, wherein the one or more processors are configured to perform operations comprising: integrating a test case management tool in a project management tool; the combined project management tool and test case management tool, coupled to a test case library database, the test case library database comprising tickets, test cases, folders and test runs and connections between the test cases, the tickets, the folders, and the test runs; during background operations, and with a large language model, summarizing the test cases in the test case library; storing the summarized test cases in a test case summary database; providing a user interface element of the test case management tool in a project management tool, the user interface element configured to receive a user request for recommendation of a selection of test cases for an input ticket; receiving ticket data; with the large language model, summarizing the ticket data; semantic searching the summarized ticket data against the test case summary database; generating first phase results from the matches obtained from the semantic searching, the first phase results, comprising a selection of test cases; a relationship finder and counter, receiving the first phase test cases, querying the test case library database for related entities to the first phase test cases; detecting a first set of additional test cases, based on the detected related entities, and generating a first group of relationship counters for the first phase test cases and the first set of additional test cases; the relationship finder and counter, receiving the input ticket; querying the test case database for test cases related to the input ticket; detecting a second set of additional test cases, based on the detected related entities; generating a second group of relationship counters for the test cases related to the input ticket and the second set of additional test cases; a scorer, generating a score for each test case, based at least partly on the first group of relationship counters and the second group of relationship counters; selecting a presentation group of test cases, based at least partly on the scores for the test cases; and displaying the presentation group of test cases in the user interface element.

Example 36: The system of Example 35, wherein generating the scores further comprises: generating a weighted average of the relationship counters.

Example 37: The system of some or all of Examples 35 and 36, wherein the first group of relationship counters comprise a plurality of counts of linkages between test runs, first phase test cases, folders and test runs; and the second group of relationship counters comprise plurality of counts of linkages between the test cases related to the input ticket and the folders, and test runs.

Example 38: The system of some or all of Examples 35-37, wherein one or more relationship counters are at least in part based on a count of linkages of test cases directly linked to the input ticket.

Example 39: The system of some or all of Examples 35-38, wherein one or more relationship counters are at least in part based on a count of linkages of test cases indirectly linked to the input ticket.

Example 40: The system of some or all of Examples 35-39, wherein selecting the presentation group comprises determining a selection of test cases having scores above a threshold percentile.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A method comprising:
   integrating in a project management tool a test case management tool, the integrating comprising generating test case management tool user interface elements in the project management tool;
   receiving a plurality of test cases via the user interface element of the test case management tool, each test case comprising a plurality of test case fields and keywords, wherein the keywords are generated by or in the project management tool and/or the test case management tool as identifier of an issue;
   storing the test cases and the plurality of test case fields for each test case in a test case library database, wherein each test case and the plurality of test case fields are stored as records in the test case library database, the test case library database comprising a database management system (DBMS) configured to provide an application programming interface (API) to the test case library database for sending, receiving and querying records to and from the test case library database;
   receiving, with a first application layer and via the DBMS, a plurality of test cases from the test case library database;
   the first application layer, placing the plurality of the test cases in a first job queue;
   a test case worker, interfacing with a text-to-vector embedder, receiving the plurality of the test cases from the first job queue, vectorizing, with the text-to-vector embedder, the plurality of the test cases, and providing the vectorized test cases to a large language model (LLM);
   the test case worker, issuing a first prompt to the large language model (LLM) to generate a summary of each vectorized test case, each summary comprising data embedded in the plurality of test case fields of each test case, the first prompt comprising a first prompt configuration file, comprising a selection of models, model performance parameters, and a method of finding summary comprising an instruction to preserve the keywords in each test case;
   storing the test case summaries in a test case summary database;
   at runtime, receiving, via the test case management tool user interface elements integrated in the project management tool, a user selection of a request to generate a selection of test cases for a ticket;
   receiving, with a second application layer, ticket data associated with the ticket, from the project management tool, the ticket data, comprising ticket fields and ticket keywords;
   the second application layer, placing the ticket data in a second job queue; a ticket worker, interfacing with the large language model, providing the ticket data from the second job queue to the large language model;
   the ticket worker, issuing a second prompt to the large language model, the second prompt comprising a second prompt configuration file, comprising a selection of models, model performance parameters, and a method of finding summary comprising an instruction to preserve the ticket keywords in the ticket data;
   the large language model, providing a ticket summary to a search module; the search module, semantically, searching the ticket summary against the test case summary database;
   the search module returning test case identifiers of test cases in the test case summary database matching with the ticket summary;
   retrieving the matched test cases from the test case library database, using the test case identifiers, and executing the retrieved matched test cases; and
   displaying the matched test cases via a user interface element of the test case management tool integrated in the project management tool, with their respective test result indicators.

2. The method of claim 1, wherein the ticket data comprises data on additionally linked tickets.

3. The method of claim 1, wherein the integrating of the test case management tool into the project management tool is via a plugin.

4. The method of claim 1 further comprising: identifying additional test cases, based in part on the matched test cases; generating a plurality of relationship counters for each test case; generating a score for each test case, based at least in part on the relationship counters; and displaying a selection of the test cases, having scores above a threshold.

5. The method of claim 4, wherein the matched test cases comprise a first phase test cases, wherein the relationship counters comprise one or more counts of linkage between the first phase test cases, a test run, a folder, the ticket, and/or additional ticket.

6. The method of claim 1, further comprising: querying the test case library database for relationships recorded in the test case library database with the matched test cases; and finding additional test cases relevant to the input ticket, based at least in part on the relationships retrieved from the test case library database.

7. A non-transitory computer storage medium that stores executable program instructions that, when executed by one or more computing devices, configure the one or more computing devices to perform operations comprising:
   integrating in a project management tool a test case management tool, the integrating comprising generating test case management tool user interface elements in the project management tool;
   receiving a plurality of test cases via the user interface element of the test case management tool, each test case comprising a plurality of test case fields and keywords, wherein the keywords are generated by or in the project management tool and/or the test case management tool as identifier of an issue;

storing the test cases and the plurality of test case fields for each test case in a test case library database, wherein each test case and the plurality of test case fields are stored as records in the test case library database, the test case library database comprising a database management system (DBMS) configured to provide an application programming interface (API) to the test case library database for sending, receiving and querying records to and from the test case library database;

receiving, with a first application layer and via the DBMS, a plurality of test cases from the test case library database;

the first application layer, placing the plurality of the test cases in a first job queue;

a test case worker, interfacing with a text-to-vector embedder, receiving the plurality of the test cases from the first job queue, vectorizing, with the text-to-vector embedder, the plurality of the test cases, and providing the vectorized test cases to a large language model (LLM);

the test case worker, issuing a first prompt to the large language model (LLM) to generate a summary of each vectorized test case, each summary comprising data embedded in the plurality of test case fields of each test case, the first prompt comprising a first prompt configuration file, comprising a selection of models, model performance parameters, and a method of finding summary comprising an instruction to preserve the keywords in each test case;

storing the test case summaries in a test case summary database;

at runtime, receiving, via the test case management tool user interface elements integrated in the project management tool, a user selection of a request to generate a selection of test cases for a ticket;

receiving, with a second application layer, ticket data associated with the ticket, from the project management tool, the ticket data, comprising ticket fields and ticket keywords;

the second application layer, placing the ticket data in a second job queue;

a ticket worker, interfacing with the large language model, providing the ticket data from the second job queue to the large language model;

the ticket worker, issuing a second prompt to the large language model, the second prompt comprising a second prompt configuration file, comprising a selection of models, model performance parameters, and a method of finding summary comprising an instruction to preserve the ticket keywords in the ticket data;

the large language model, providing a ticket summary to a search module; the search module, semantically, searching the ticket summary against the test case summary database; the search module returning test case identifiers of test cases in the test case summary database matching with the ticket summary;

retrieving the matched test cases from the test case library database, using the test case identifiers, and executing the retrieved matched test cases; and displaying the matched test cases via a user interface element of the test case management tool integrated in the project management tool, with their respective test result indicators.

8. The non-transitory computer storage of claim 7, wherein the ticket data comprises data on additionally linked tickets.

9. The non-transitory computer storage of claim 7, wherein the integrating of the test case management tool into the project management tool is via a plugin.

10. The non-transitory computer storage of claim 7, wherein the operations further comprise:

identifying additional test cases, based in part on the matched test cases; generating a plurality of relationship counters for each test case; generating a score for each test case, based at least in part on the relationship counters; and displaying a selection of the test cases, having scores above a threshold.

11. The non-transitory computer storage of claim 10, wherein the matched test cases comprise a first phase test cases, wherein the relationship counters comprise one or more counts of linkage between the first phase test cases, a test run, a folder, the ticket, and/or additional ticket.

12. The non-transitory computer storage of claim 7, wherein the operations further comprise: querying the test case library database for relationships recorded in the test case library database with the matched test cases; and finding additional test cases relevant to the ticket, based at least in part on the relationships retrieved from the test case library database.

13. A system comprising one or more processors, wherein the one or more processors are configured to perform operations comprising:

integrating in a project management tool a test case management tool, the integrating comprising generating test case management tool user interface elements in the project management tool;

receiving a plurality of test cases via the user interface element of the test case management tool, each test case comprising a plurality of test case fields and keywords, wherein the keywords are generated by or in the project management tool and/or the test case management tool as identifier of an issue;

storing the test cases and the plurality of test case fields for each test case in a test case library database, wherein each test case and the plurality of test case fields are stored as records in the test case library database, the test case library database comprising a database management system (DBMS) configured to provide an application programming interface (API) to the test case library database for sending, receiving and querying records to and from the test case library database;

receiving, with a first application layer and via the DBMS, a plurality of test cases from the test case library database;

the first application layer, placing the plurality of the test cases in a first job queue;

a test case worker, interfacing with a text-to-vector embedder, receiving the plurality of the test cases from the first job queue, vectorizing, with the text-to-vector embedder, the plurality of the test cases, and providing the vectorized test cases to a large language model (LLM);

the test case worker, issuing a first prompt to the large language model (LLM) to generate a summary of each vectorized test case, each summary comprising data embedded in the plurality of test case fields of each test case, the first prompt comprising a first prompt configuration file, comprising a selection of models, model performance parameters, and a method of finding summary comprising an instruction to preserve the keywords in each test case;

storing the test case summaries in a test case summary database;

at runtime, receiving, via the test case management tool user interface elements integrated in the project management tool, a user selection of a request to generate a selection of test cases for a ticket;

receiving, with a second application layer, ticket data associated with the ticket, from the project management tool, the ticket data, comprising ticket fields and ticket keywords;

the second application layer, placing the ticket data in a second job queue;

a ticket worker, interfacing with the large language model, providing the ticket data from the second job queue to the large language model;

the ticket worker, issuing a second prompt to the large language model, the second prompt comprising a second prompt configuration file, comprising a selection of models, model performance parameters, and a method of finding summary comprising an instruction to preserve the ticket keywords in the ticket data;

the large language model, providing a ticket summary to a search module;

the search module, semantically, searching the ticket summary against the test case summary database;

the search module returning test case identifiers of test cases in the test case summary database matching with the ticket summary;

retrieving the matched test cases from the test case library database, using the test case identifiers, and executing the retrieved matched test cases; and displaying the matched test cases via a user interface element of the test case management tool integrated in the project management tool, with their respective test result indicators.

14. The system of claim 13, wherein the integrating of the test case management tool into the project management tool is via a plugin.

15. The system of claim 13, wherein the operations further comprise: identifying additional test cases, based in part on the matched test cases; generating a plurality of relationship counters for each test case; generating a score for each test case, based at least in part on the relationship counters; and displaying a selection of the test cases, having scores above a threshold.

16. The system of claim 15, wherein the matched test cases comprise a first phase test cases, wherein the relationship counters comprise one or more counts of linkage between a first phase test case, a test run, a folder, the ticket, and/or additional ticket.

17. The system of claim 13, wherein the operations further comprise:

querying the test case library database for relationships recorded in the test case library database with the matched test cases; and finding additional test cases relevant to the ticket, based at least in part on the relationships retrieved from the test case library database.

\* \* \* \* \*